US010625606B2

(12) United States Patent
Younggren et al.

(10) Patent No.: US 10,625,606 B2
(45) Date of Patent: *Apr. 21, 2020

(54) DUAL CLUTCH TRANSAXLE

(71) Applicant: TEAM Industries, Inc., Bagley, MN (US)

(72) Inventors: Bruce H. Younggren, Bagley, MN (US); Brandon P. Lenk, Shevlin, MN (US); Thomas Richard Rosenbush, Bagley, MN (US); Ronald Joseph Wendt, Bemidji, MN (US); Michael Allen Mueller, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,478

(22) Filed: Feb. 14, 2019

(65) Prior Publication Data
US 2019/0176617 A1    Jun. 13, 2019

Related U.S. Application Data

(63) Continuation of application No. 15/411,487, filed on Jan. 20, 2017, now Pat. No. 10,252,613.
(Continued)

(51) Int. Cl.
*B60K 17/16* (2006.01)
*F16H 37/08* (2006.01)
(Continued)

(52) U.S. Cl.
CPC ............ *B60K 17/344* (2013.01); *B60K 17/16* (2013.01); *B60K 17/346* (2013.01); *F16H 3/006* (2013.01);
(Continued)

(58) Field of Classification Search
CPC .... B60K 17/344; B60K 17/346; B60K 17/08; B60K 17/16; F16H 3/085; F16H 3/006;
(Continued)

(56) References Cited

U.S. PATENT DOCUMENTS

| 4,576,063 A | 3/1986 | Akashi et al. |
| 5,590,563 A | 1/1997 | Kuwahata et al. |

(Continued)

FOREIGN PATENT DOCUMENTS

| DE | 102008008496 A1 | 8/2009 |
| DE | 102012202492 A1 | 8/2013 |

(Continued)

OTHER PUBLICATIONS

Autos Weblog, "Dual Clutch Transmission.html", "html://www.autosweblog.com/cat/dual-clutch-transmission.html", Jan. 20, 2017, pp. 1-7.
(Continued)

*Primary Examiner* — Jacob S. Scott
*Assistant Examiner* — Lillian T Nguyen
(74) *Attorney, Agent, or Firm* — Fogg & Powers LLC

(57) ABSTRACT

A dual clutch transaxle is provided that includes a dual clutch assembly, an input shaft assembly, a counter shaft assembly, a shift assembly and at least one output assembly. The dual clutch assembly has a dual clutch axis and includes a first clutch shaft and a second clutch shaft. The input shaft assembly includes a nested first inner input shaft and a second outer input shaft that are operationally coupled to the first clutch shaft and a second clutch shaft. An input shaft axis is offset from the dual clutch axis of the dual clutch assembly. A plurality of drive gears of the input shaft assembly are operationally coupled to a plurality of driven gears of the counter shaft assembly. The shift assembly is operationally coupled to select. The at least one output (Continued)

assembly is operationally coupled to the counter shaft assembly.

20 Claims, 19 Drawing Sheets

Related U.S. Application Data

(60) Provisional application No. 62/286,492, filed on Jan. 25, 2016, provisional application No. 62/286,198, filed on Jan. 22, 2016.

(51) Int. Cl.
*B60K 17/344* (2006.01)
*B60K 17/346* (2006.01)
*F16H 3/091* (2006.01)
*F16H 3/00* (2006.01)
*F16H 3/085* (2006.01)
*F16H 3/093* (2006.01)
*F16H 48/08* (2006.01)
*F16H 61/32* (2006.01)
*F16H 63/34* (2006.01)
*B60K 5/00* (2006.01)
*B60K 17/08* (2006.01)
*F16H 61/28* (2006.01)

(52) U.S. Cl.
CPC ............ *F16H 3/085* (2013.01); *F16H 3/091* (2013.01); *F16H 3/093* (2013.01); *F16H 37/0806* (2013.01); *F16H 48/08* (2013.01); *F16H 61/32* (2013.01); *F16H 63/3416* (2013.01); *B60K 17/08* (2013.01); *B60K 2005/003* (2013.01); *F16H 2061/2869* (2013.01); *F16H 2200/0017* (2013.01); *F16H 2200/0069* (2013.01)

(58) Field of Classification Search
CPC .......... F16H 48/08; F16H 61/32; F16H 3/093; F16H 3/091; F16H 37/0806; F16H 2061/2869; F16H 2200/0017; F16H 2200/0069
See application file for complete search history.

(56) References Cited

U.S. PATENT DOCUMENTS

| | | | |
|---|---|---|---|
| 6,085,607 A | 7/2000 | Narita et al. | |
| 6,887,184 B2 | 5/2005 | Buchanan et al. | |
| 7,467,564 B2 | 12/2008 | Baldwin et al. | |
| 7,752,932 B2 | 7/2010 | Chen et al. | |
| 8,037,779 B2 | 10/2011 | Shiozaki et al. | |
| 8,042,419 B2 | 10/2011 | Mizuno et al. | |
| 8,042,420 B2 | 10/2011 | Tsunashima et al. | |
| 8,057,359 B2 | 11/2011 | Tsukada et al. | |
| 8,109,166 B2 | 2/2012 | Tsukada et al. | |
| 8,127,635 B2 | 3/2012 | Tsukada et al. | |
| 8,635,927 B2 | 1/2014 | Akashi et al. | |
| 8,646,349 B2 | 2/2014 | Pesola et al. | |
| 8,827,852 B2 | 9/2014 | Ikegami | |
| 8,930,103 B2 | 1/2015 | Faust | |
| 9,016,154 B2 | 4/2015 | Pregnolato et al. | |
| 9,550,417 B2 | 1/2017 | Fujimoto et al. | |
| 10,252,613 B2 * | 4/2019 | Younggren | F16H 63/3416 |
| 2004/0166991 A1 | 8/2004 | Buchanan et al. | |
| 2008/0220936 A1 | 9/2008 | Kobayashi et al. | |
| 2008/0271555 A1 | 11/2008 | Patzner | |
| 2011/0048150 A1 | 3/2011 | Dreibholz et al. | |
| 2013/0091984 A1 | 4/2013 | Pesola et al. | |
| 2013/0133451 A1 | 5/2013 | Schneider et al. | |
| 2014/0343807 A1 | 11/2014 | Maki | |
| 2015/0274011 A1 | 10/2015 | Fujimoto et al. | |
| 2016/0312857 A1 | 10/2016 | Wechs | |

FOREIGN PATENT DOCUMENTS

| | | |
|---|---|---|
| EP | 1957833 | 6/2007 |
| EP | 2042766 B1 | 2/2011 |
| GB | 239426 A | 9/1925 |
| GB | 2186333 A | 8/1987 |
| GB | 2394261 A | 4/2004 |
| JP | 2012007659 A | 1/2012 |
| JP | 2014070686 A | 4/2014 |

OTHER PUBLICATIONS

International Searching Authority, "International Search Report and Written Opinion from PCT Application No. PCT/US2017/014301 dated May 19, 2017", from Foreign Counterpart to U.S. Appl. No. 15/411,487, filed May 19, 2017, pp. 1-31, Published: WO.
Remmlinger et al., "New Seven-Speed Dual-Clutch Transmissions with Transaxle Design", "https://link.springer.com/article/10.1007/BF03222035", pp. 1068-1077.
U.S. Patent and Trademark Office, "Notice of Allowance", U.S. Appl. No. 15/411,487, dated Nov. 15, 2018, pp. 1-10, Published: US.
U.S. Patent and Trademark Office, "Office Action", U.S. Appl. No. 15/411,487, dated Jun. 29, 2018, pp. 1-22, Published: US.
U.S. Patent and Trademark Office, "Restriction Requirement", U.S. Appl. No. 15/411,487, dated Mar. 9, 2018, pp. 1-7, Published: US.

* cited by examiner

DUAL CLUTCH TRANSAXLE

CROSS-REFERENCE TO RELATED APPLICATIONS

This application claims priority to U.S. Utility patent application Ser. No. 15/411,487, entitled "Dual Clutch Transaxle", filed on Jan. 20, 2017, U.S. Provisional Application Ser. No. 62/286,198 entitled "Dual Clutch Transmission System", filed on Jan. 22, 2016 and U.S. Provisional Application Ser. No. 62/286,492 entitled "Dual Clutch Transmission System," filed on Jan. 25, 2016 all of which are incorporated in their entirety herein by reference.

BACKGROUND

A dual clutch transmission is a transmission for a motorized vehicle that has multiple gears where the odd gears (1, 3, 5 . . . ) are controlled by one clutch and the even gears (2, 4, 6 . . . ) are controlled by a second independent clutch. Dual clutches can be housed either in one housing or in separate housings. In operation, assuming a first clutch controls the odd gears and a second clutch controls the even gears) when the vehicle is being driven in first gear, the first clutch is engaged and second clutch is open. When a shift to second gear is determined to be necessary either by a controller or a driver, a mechanism moves a dog clutch or synchronizer to engage the second gear. With the second clutch still open, no power is transmitted through the second gear. To make the shift from first gear to second gear, the first clutch will open and the second clutch will close. Power is now being transmitted through the second gear. Because the first clutch is open, no power is going through the first gear. When a shift to third gear is determined to be necessary, the process repeats itself and a mechanism moves the odd dog clutch or synchronizer to the third gear and the second clutch will open and first clutch will close. This process of moving a mechanism to engage a dog clutch or synchronizer then opening one clutch and closing the other repeats for all upshifts and all downshifts. A standard vehicle layout has the transmission in the middle of the vehicle, in front of the motor, with prop shafts running from the dual clutch transmission to a front and rear bevel gear cases is typical and easily packaged into the vehicle. However, many recreational vehicles such as, but not limited to, utility task vehicles (UTV) have limited space between the passenger compartment and the rear differential where a dual clutch transmission or transaxle would be located.

For the reasons stated above and for other reasons stated below which will become apparent to those skilled in the art upon reading and understanding the present specification, there is a need in the art for dual clutch transaxle that effectively and efficiently fits within the size and location limitations of vehicles.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a dual clutch transaxle is provided that includes a dual clutch assembly, an input shaft assembly, a counter shaft assembly, a shift assembly and at least one output assembly. The dual clutch assembly includes a first inner clutch shaft and a second outer clutch shaft. The dual clutch assembly has a dual clutch axis. The dual clutch assembly is further configured to be coupled to receive torque from a motor. The input shaft assembly includes a nested first inner input shaft and a second outer input shaft. The input shaft assembly has a plurality of drive gears. The input shaft assembly further has an input shaft axis. The input shaft axis is offset from the dual clutch axis of the dual clutch assembly. The first inner clutch shaft of the dual clutch assembly is operationally coupled to one of the first inner input shaft and the second outer input shaft of the input shaft assembly and the second outer clutch shaft of the dual clutch assembly is operationally coupled to the other of the first inner input shaft and the second outer input shaft of the input shaft assembly. The counter shaft assembly has a plurality of driven gears. The plurality of drive gears of the input shaft assembly are operationally coupled to the plurality of driven gears of the counter shaft assembly. The shift assembly is operationally coupled to at least one of the input shaft assembly and the counter shaft assembly to select gearing of the dual clutch transaxle. The at least one output assembly is operationally coupled to the counter shaft assembly. The output assembly is configured to provide an output of the dual clutch transaxle.

In another embodiment, another dual clutch transaxle is provided. The dual clutch transaxle includes a dual clutch assembly, an input shaft assembly, a counter shaft assembly, a shift drum assembly, first output assembly and a second output assembly. The dual clutch assembly includes a first clutch shaft and a second clutch shaft. The dual clutch assembly having a dual clutch axis. The dual clutch assembly is configured to receive torque from a motor. The input shaft assembly includes a nested first inner input shaft and a second outer input shaft. The first inner input shaft has at least one drive gear and the second outer input shaft has at least one other drive gear. The input shaft assembly further has an input shaft axis. The first clutch shaft of the dual clutch assembly is operationally coupled to one of the first inner input shaft and the second input shaft of the input shaft assembly and the second outer clutch shaft of the dual clutch assembly operationally coupled to one of the other of the first inner input shaft and the second outer input shaft of the input shaft assembly. The counter shaft assembly has at least a driven gear engaged with the at least one drive gear and at least one other driven gear engaged with the at least one other drive gear of the input shaft assembly. The shift assembly is operationally coupled to at least one of the input shaft assembly and the counter shaft assembly to select gearing of the dual clutch transaxle. The first output assembly is operationally coupled to the counter shaft assembly. The first output assembly is configured to provide a first output of the dual clutch transaxle. The first output assembly having an output axis that is transverse and below the input shaft axis. The second output assembly is operationally coupled to the counter shaft assembly.

In still another embodiment, a vehicle provided. The vehicle includes a motor, a dual clutch transaxle, a set of rear wheels, a set of front wheels and a front differential. The motor provides torque. The dual clutch transaxle includes a dual clutch assembly, an input shaft assembly, a counter shaft assembly, a first output assembly and a second output assembly. The dual clutch assembly is coupled to receive the torque from the motor. The dual clutch assembly includes a first inner clutch shaft and a second outer clutch shaft. The dual clutch assembly has a dual clutch axis. The input shaft assembly includes a nested first inner input shaft and a second outer input shaft. The input shaft assembly has a plurality of drive gears. The input shaft assembly further has an input shaft axis. The input shaft axis is offset from the dual clutch axis of the dual clutch assembly. The first inner clutch shaft of the dual clutch assembly is operationally coupled to one of the first inner input shaft and the second outer input shaft of the input shaft assembly and the second outer clutch shaft of the dual clutch assembly operationally coupled to the other of the first inner input shaft and the second outer input shaft of the input shaft assembly. The counter shaft assembly has at least a driven gear engaged with the at least one drive gear and at least one other driven gear engaged with the at least one other drive gear of the input shaft assembly. The shift drum assembly is operationally coupled to at least one of the input shaft assembly and the counter shaft assembly to select gearing of the dual clutch transaxle. The first output assembly is operationally coupled to the counter shaft assembly. The first output assembly is configured to provide a first output of the dual clutch transaxle. The first output assembly has a first output axis that is transverse to the dual clutch axis. The second output assembly is operationally coupled to the counter shaft assembly. The set of rear wheels are operationally coupled to the output differential. The front differential is operationally coupled to the second output and the set of front wheels is operationally coupled to the front differential.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 7:
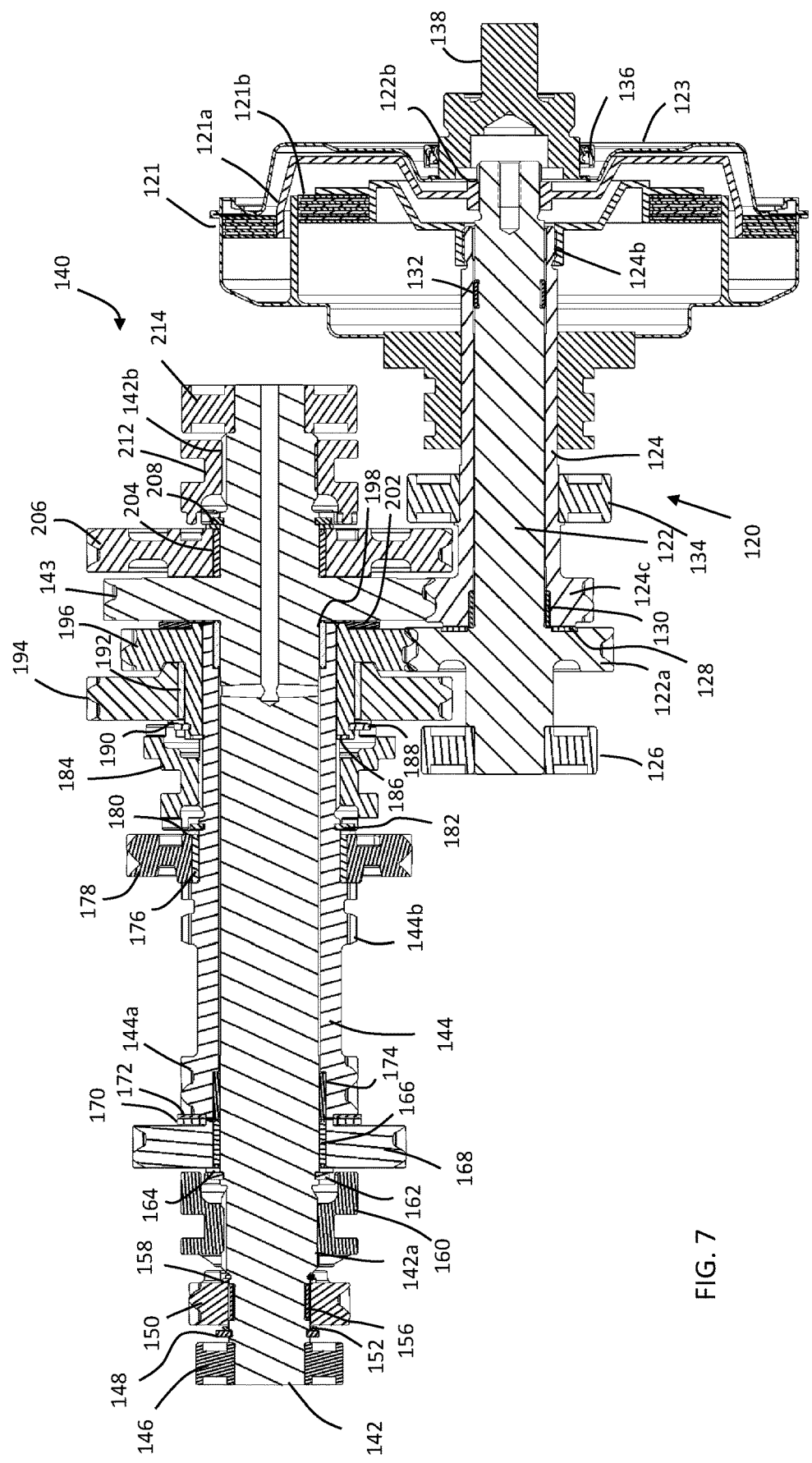
FIG. 7 is a partial cross-sectional first side view of the dual clutch transaxle of FIG. 1 illustrating how the inner input shaft and outer input shaft interact with the inner and outer clutch shafts.
Figure 8:
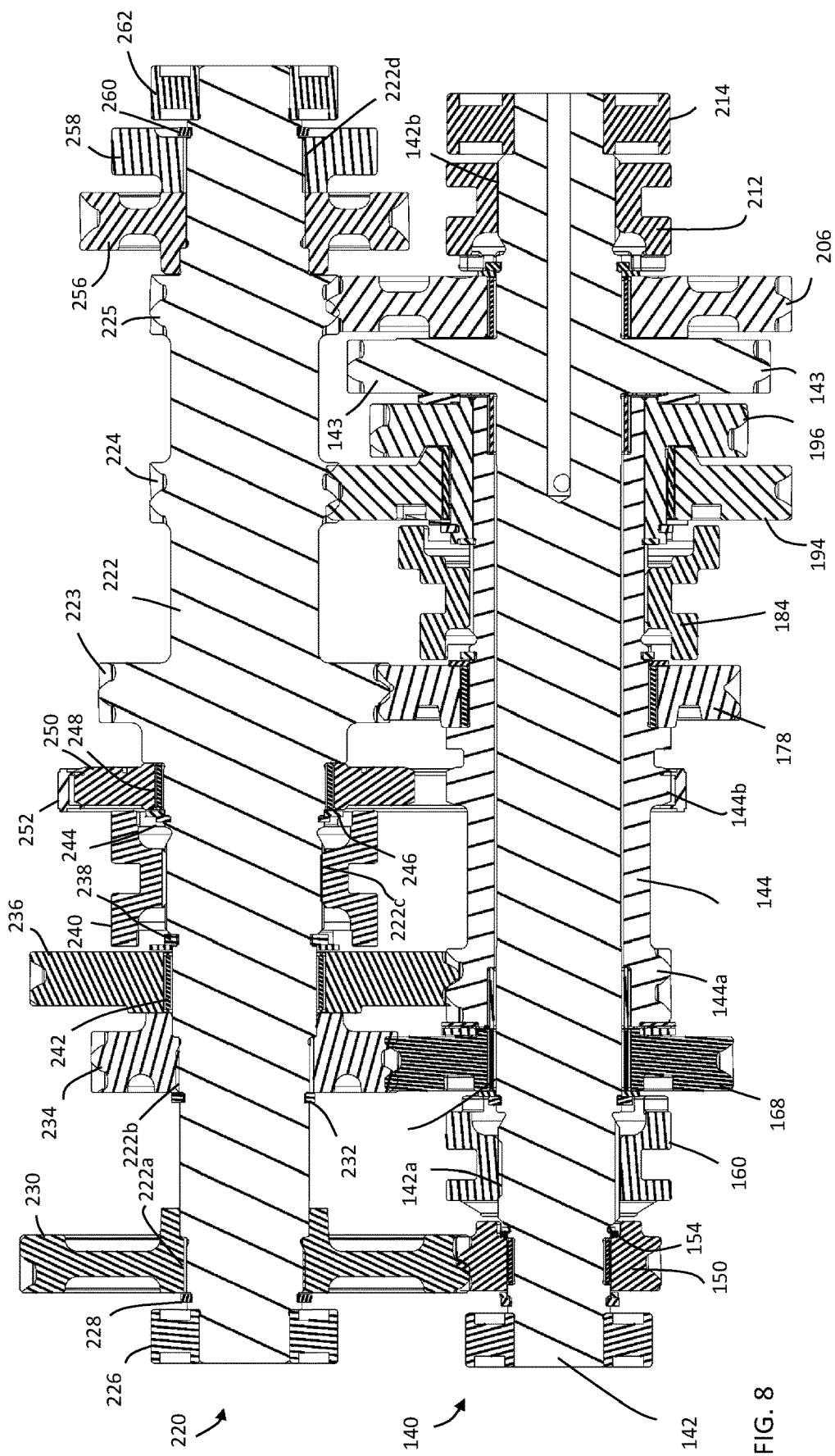
FIG. 8 is a partial cross-sectional top view of the dual clutch transaxle of FIG. 1 illustrating the how the inner input shaft and outer input shaft interact with the countershaft.

Embodiments of the present invention provide a dual clutch transaxle having a dual clutch assembly, an input shaft assembly and a counter shaft assembly. In embodiments, an input shaft assembly axis is in a different location that dual clutch assembly axis. In some embodiments, an output differential assembly is positioned below at least one of the input shaft assembly and counter shaft assembly. Moreover, some embodiments require no gear reduction out of the dual clutch assembly. A first embodiment of a dual clutch transaxle 100 is illustrated in FIGS. 1 through 8. FIGS. 1-5 illustrate different views of the assembled dual clutch transaxle 100 while FIGS. 6A through 6D illustrate the unassembled components that make up assemblies the dual clutch transaxle 100. Further FIGS. 7 and 8 illustrate cross-sectional views of some components of the dual clutch transaxle 100. The following description of the dual clutch transaxle 100 is provided in light of FIGS. 1 through 8. The dual clutch transaxles in embodiments are shown without casing or housings for illustration purposes. It is noted that at least some of the bearing shown in the Figures would be engaged with a casing or housing of the dual clutch transaxle.

Figure 6A:
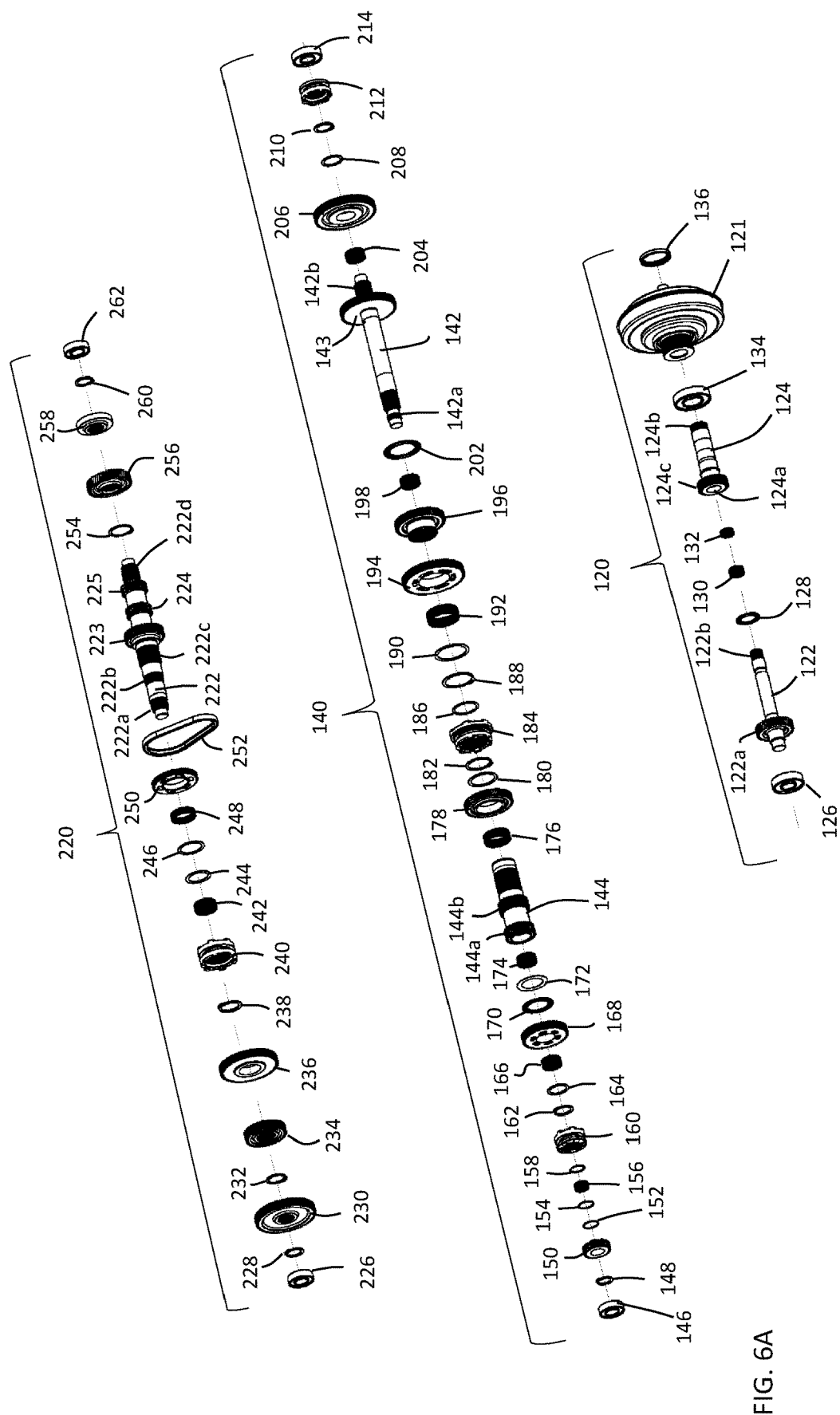
FIGS. 6A through 6D illustrate unassembled components that make up at least in part the dual clutch transaxle of FIG. 1.

Referring to FIG. 6A, the dual clutch transaxle 100 includes a dual clutch assembly 120, and input shaft assembly 140 and a counter shaft assembly 220. FIG. 6A illustrates the assemblies unassembled. The dual clutch assembly 120 in this embodiment includes a dual clutch 121. The dual clutch 121 in this embodiment is a nested dual clutch including a first clutch 121a and a second clutch 121b as best illustrated in FIG. 7. Referring back to FIG. 6A, the dual clutch assembly 120 further includes a first clutch shaft 122 and a second clutch shaft 124. In a dual clutch nested assembly, the first clutch shaft is a first inner clutch shaft 122 and the second clutch shaft is a second outer clutch shaft 124. The first inner clutch shaft 122 includes a first inner clutch gear 122a and inner end clutch splines 122b. The second outer clutch shaft 124 has a central passage 124a in which a portion of the inner clutch shaft 122 is received. The second outer clutch shaft 124 further includes a second outer clutch gear 124c and outer end clutch splines 124b. The dual clutch assembly 120 further includes bearings 126, 128, 130 and 132 mounted on the first inner clutch shaft 122 and bearing 134 mounted on the second outer clutch shaft 124. The dual clutch assembly further includes a seal 136. As best illustrated in FIG. 7, the inner end clutch splines 122b of the first inner clutch shaft 122 mate with splines of the first clutch 121a to lock rotation of the first inner clutch shaft 122 with the first clutch 121a of the dual clutch 121. The outer end clutch splines 124b of the second outer clutch shaft 124 mate with splines of the second clutch 121b to lock rotation of the second outer clutch shaft 124 with the second clutch 121b of the dual clutch 121. The seal 136, is positioned between a cover plate 123 and a torque clutch input shaft 138 as illustrated in FIG. 7. The torque clutch input shaft 138 provides torque from a crank shaft of an engine 502 (shown in FIG. 9) to the dual clutch assembly 120.

Referring back to FIG. 6A the input shaft assembly 140 of the dual clutch transaxle 100 unassembled is shown. The input shaft assembly 140 in this embodiment includes a first inner input shaft 142 and a second outer input shaft 144. A nesting of the inner input shaft 142 in the outer input shaft 142 is best illustrated in the cross-sectional views of FIGS. 7 and 8. The first inner input shaft assembly 142 includes a first set of splines 142a, an inner input shaft first driven gear 143 and second set of splines 142b. The second outer input shaft 144 includes a second drive gear 144a and a reverse drive sprocket 144b. Mounted on a first end of the first input shaft 142 is bearing 146, retaining ring 148, a first drive gear 150, washer 152, washer 154, bearing 156, retaining ring 158, first shift dog 160, retaining clip 162, washer 164, bearing 166, third drive gear 168, bearing 170, washer 172 and bearing 174. Mounted on the second outer input shaft 144 is bearing 176, fourth drive gear 178, washer 180, retaining ring 182, shift dog 184, retaining ring 186, retaining ring 188, washer 190, bearing 192, sixth drive gear 194, outer input shaft second driven gear 196, bearing 198 and bearing 202. Further mounted on a second end of the first input shaft 142 is bearing 204, fifth drive gear 206, washer 208, retaining ring 210, fourth shift dog 212 and bearing 214. FIG. 7 best shows how the components of the input shaft assembly 140 are assembled.

The dual clutch transaxle 100 further includes a counter shaft assembly 220. The counter shaft assembly 220 includes a counter shaft 222. The counter shaft 222 includes outer splines 222a, 222b, 222c and 222d. The counter shaft 222 also includes fourth driven gear 223, sixth driven gear 224 and fifth driven gear 225. Mounted on a first side of the counter shaft 222 is bearing 226, retaining ring 228, first driven gear 230, retaining ring 232, third driven gear 234, second driven gear 236, retaining ring 238, second shift dog 240, bearing 242, retaining ring 244, washer 246, bearing 248 and sprocket 250. A chain 252 is engaged with sprocket 250. On the other side of the counter shaft 222 is mounted, a retaining ring 254, a counter shaft output drive gear 256, a park shift dog 258, a retaining ring 260 and a bearing 262. FIG. 8 best shows how the components of the counter shaft assembly 220 are assembled. As illustrated in FIG. 8, splines 222a of the counter shaft 222 lock rotation of the first driven gear 230 with the counter shaft 222. Splines 222b of the counter shaft 222 lock rotation of the third driven gear 234 with the counter shaft 222. Splines 222c of the counter shaft 222 lock rotation of the second shift dog 240 with rotation of the counter shaft 222. Finally, splines 222d of the counter shaft 222 lock rotation of the park shift dog 258 and counter shaft output drive gear 256 with rotation of the counter shaft 222.

Figure 3:
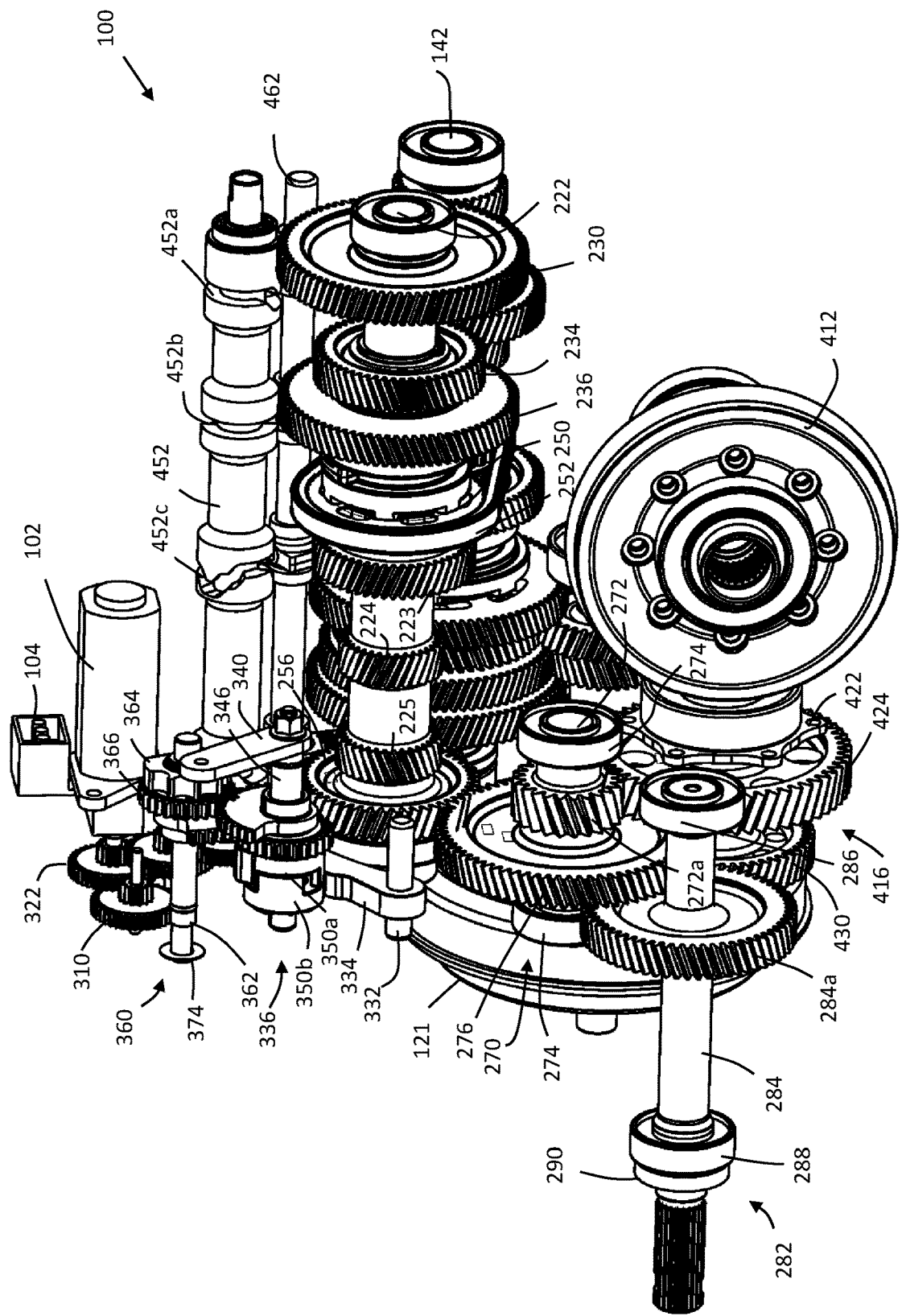
FIG. 3 is a second side perspective view of the dual clutch transaxle of FIG. 1.
Figure 4:
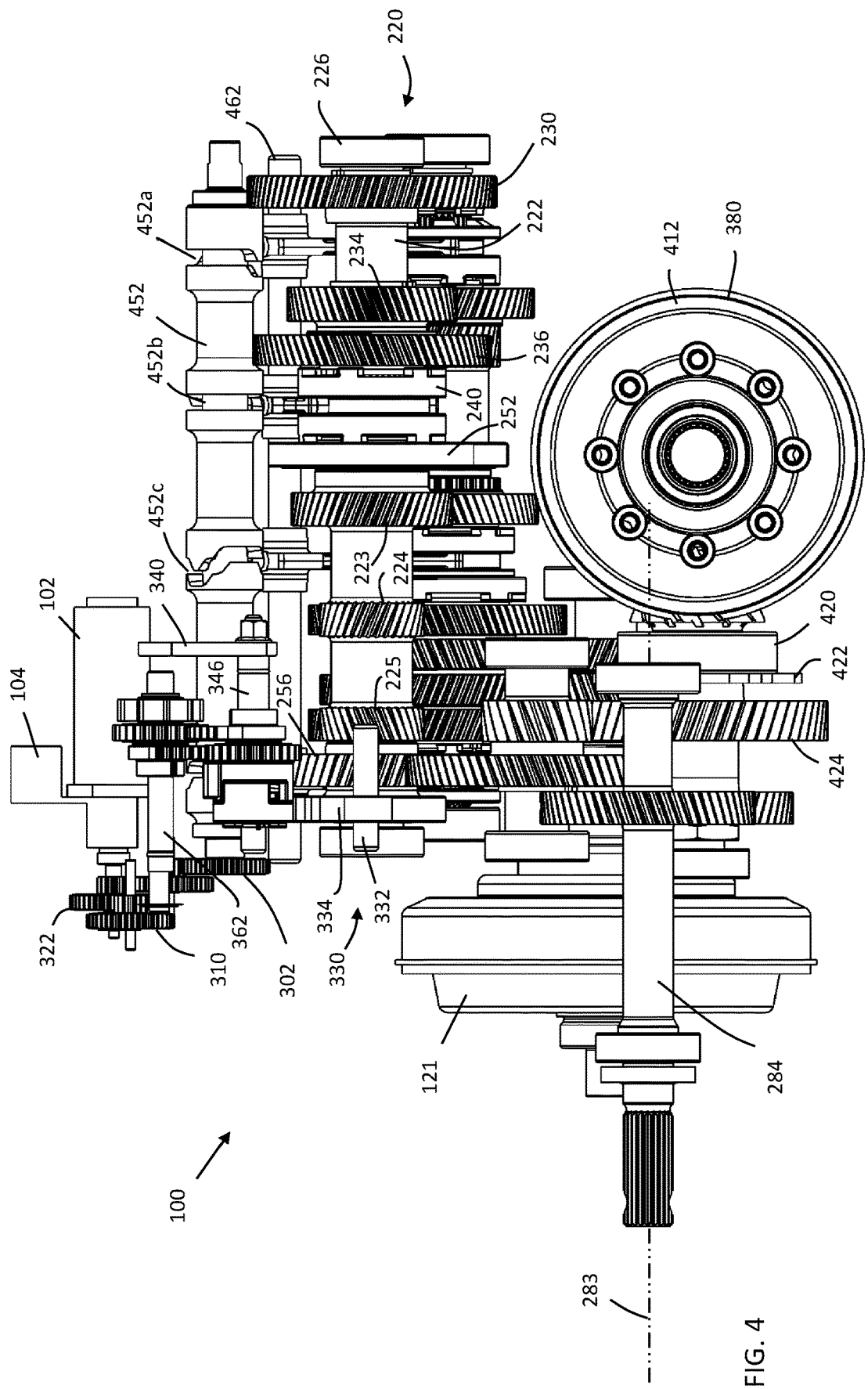
FIG. 4 is a second side view of the dual clutch transaxle of FIG. 1.
Figure 6B:
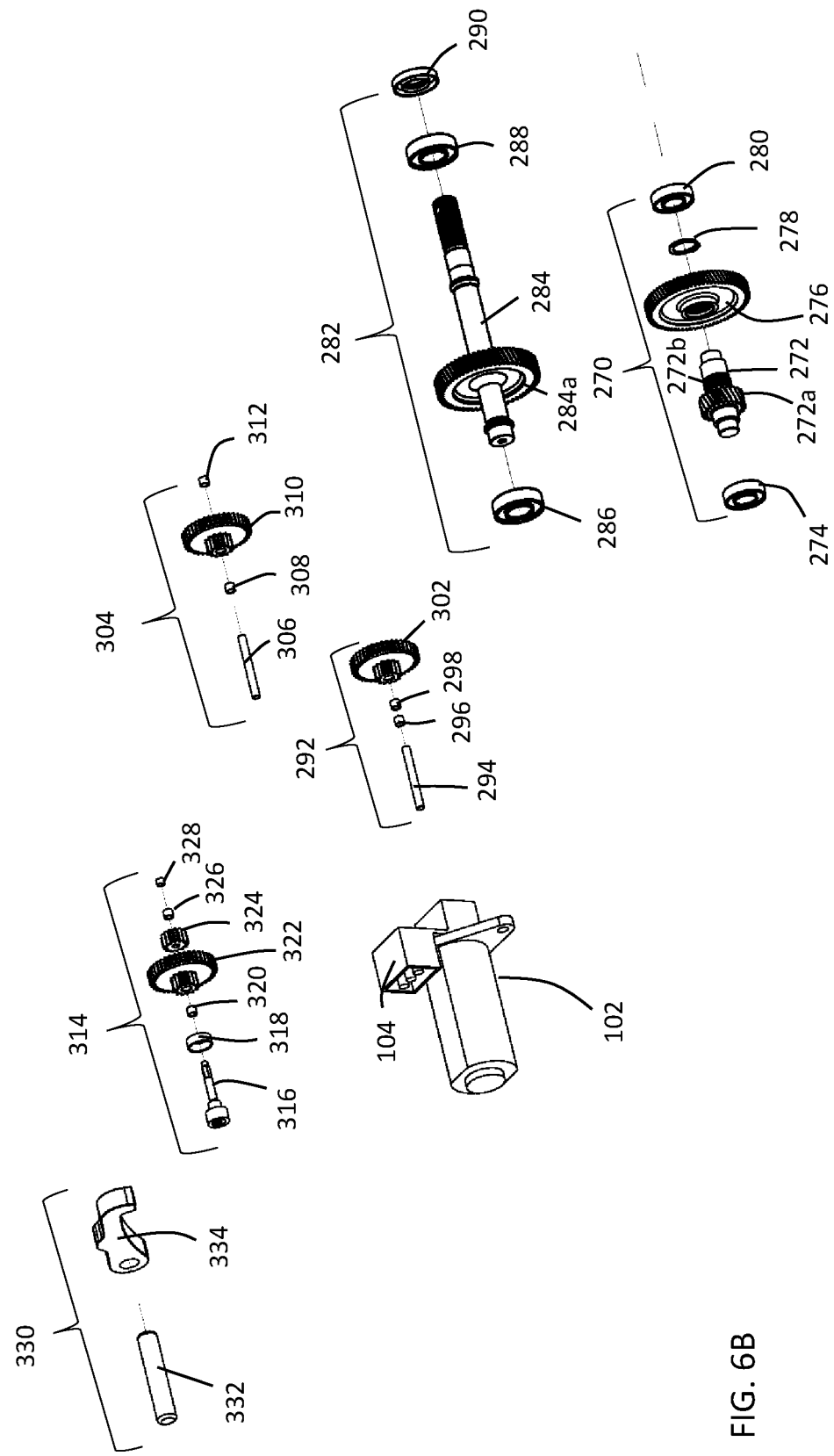

Further components of the dual clutch transaxle 100 is illustrated in FIG. 6B. The dual clutch transaxle 100 includes an idler assembly 270 and a front output assembly 282. The idler assembly 270 includes an idler shaft 272 with an idler gear 272a. Mounted on the idler shaft 272 is a bearing 274, a second stage gear 276, a retaining ring 278 and a bearing 280. The second stage gear 276 is rotationally locked to the idler shaft 272 via splines 272b. The assembled idler assembly 270 is best shown in FIG. 3. The front output assembly 282 includes a front output shaft 284 that has a front output gear 284a. Mounted on the front output shaft 284 is bearing 286, bearing 288 and seal 290. The assembled front output assembly is also best shown in FIG. 3 and FIG. 4. The front output assembly 282 (second output assembly) has a front output axis 283 that is parallel to the dual clutch axis 106 in an embodiment. Note the dual clutch transaxle 100 is shown without a housing for illustration purposes. Bearings 288 and 286 as well as seal 290 would engage the housing.

The dual clutch transaxle 100 also includes an electric shift motor 102 with a power port 104. A gear cluster made up of a first assembly 314, a second assembly 304 and a third assembly 292 as illustrated in the unassembled view of FIG. 6B. The first assembly 314 includes a motor shaft 316 that is operationally coupled to the electric motor 102, bearing 318, bearing 320, first cluster gear 322, first pinion gear 324, bearing 326 and bearing 328. The second assembly 304 includes a cluster shaft 306 upon which is mounted bearing 308 a second cluster gear 310 and bearing 312. The third assembly 292 includes a cluster shaft 294 upon which is mounted bearing 296, bearing 298 and cluster gear 302. Cluster gears 322, 310 and 302 and can be seen assembled at in FIGS. 1 through 5. The gear cluster transfers the rotational output from the electric shift motor 102 to the shift drum assembly 450 via shift drum gear 458 discussed further below. Further illustrated in FIG. 6B is a park assembly 330. The park assembly includes a park rail shaft 332 and a park pawl 334. An assembled park pawl is best illustrated in FIG. 3.

Figure 5:
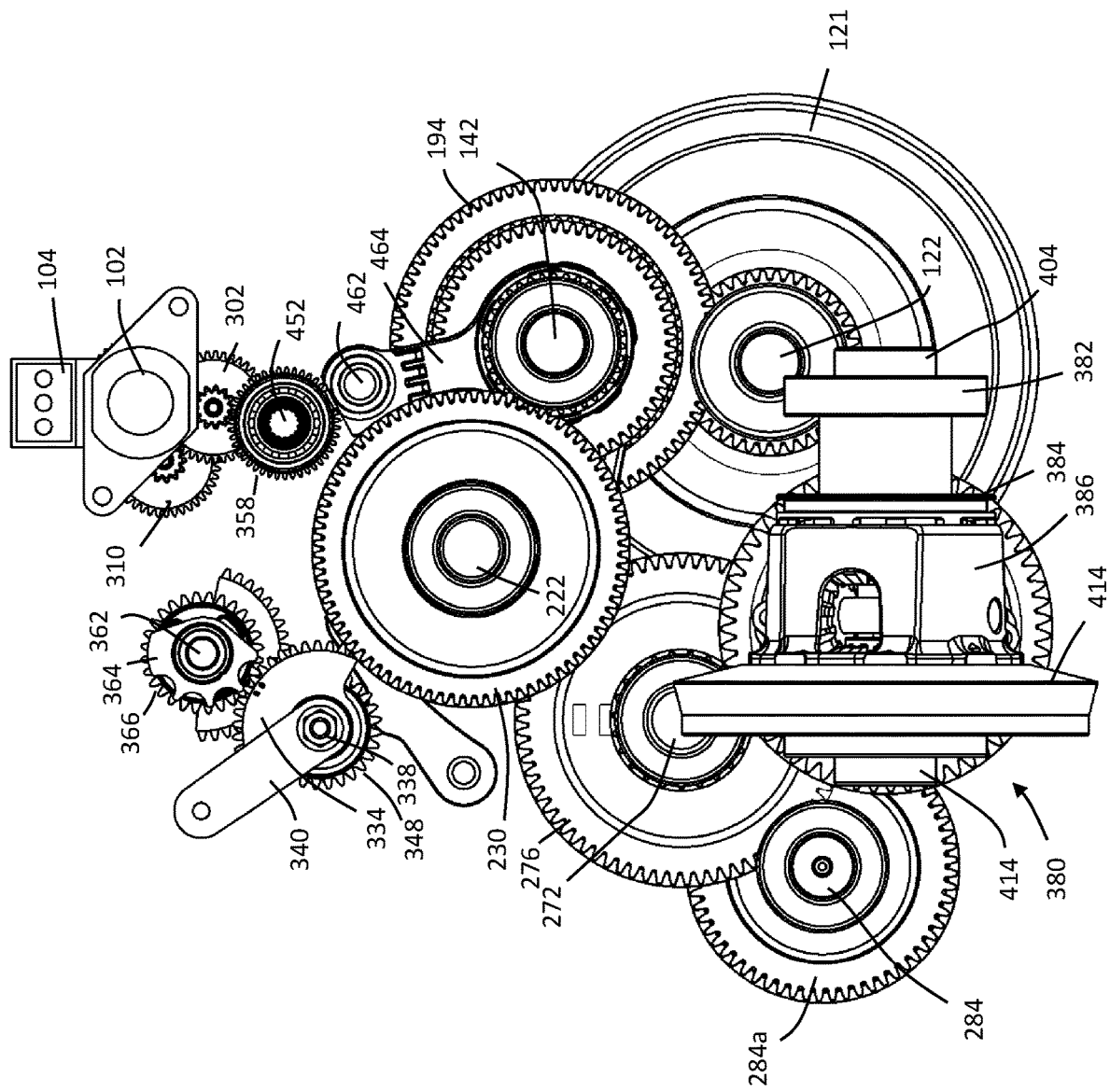
FIG. 5 is a first end view of the dual clutch transaxle of FIG. 1.
Figure 6C:
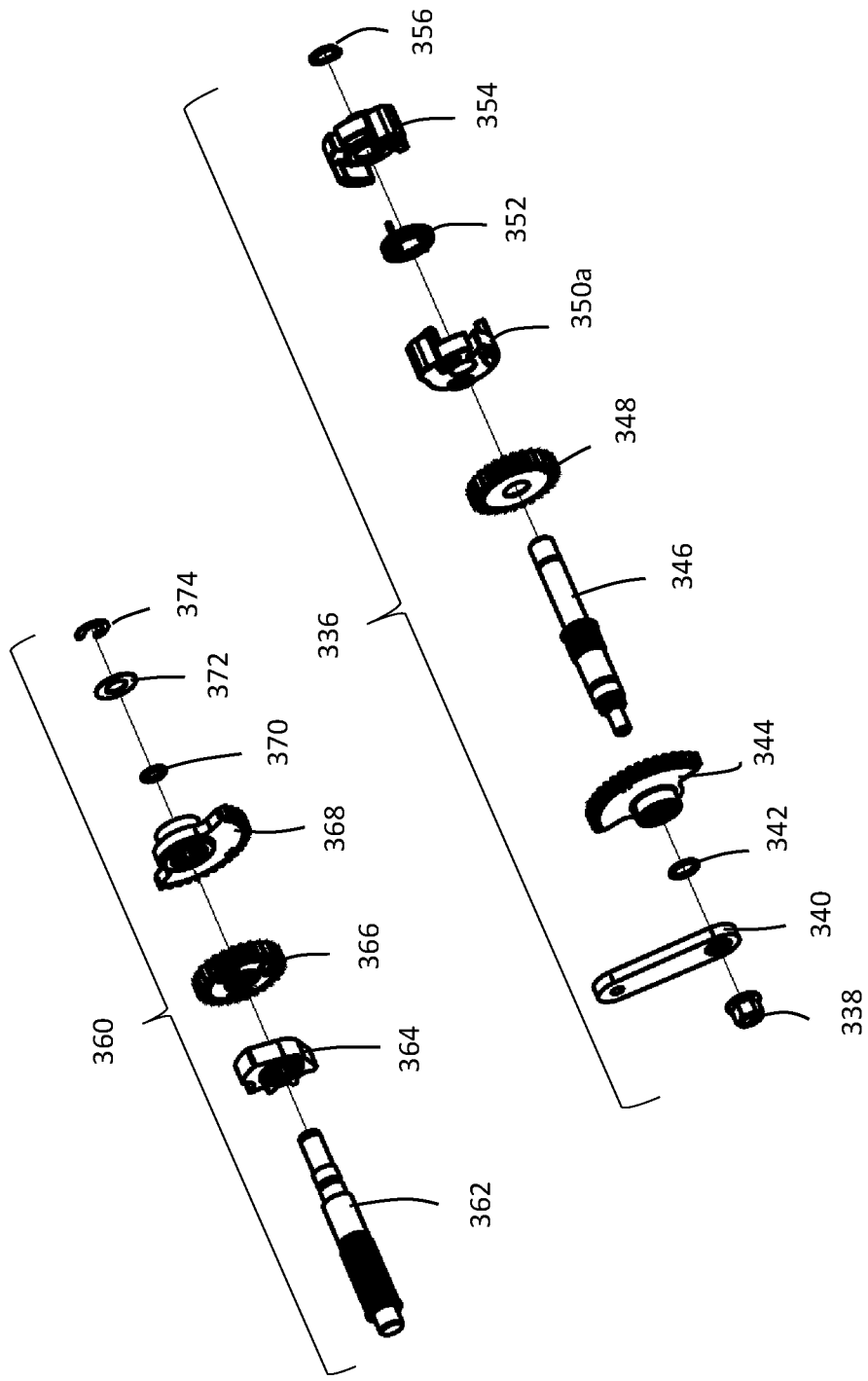

Referring to FIG. 6C, unassembled first shift park assembly 336 and a second shift park assembly 360 is illustrated. The first shaft park assembly 336 includes a first shift shaft 346. Mounted on a first side of the first shift shaft 346 is a first sector gear 344, O-ring 342, bell crank 340 and nut 338. Mounted on a second side of the first shift shaft 346 is a second sector gear 348, a first portion of a park cam 350a, a torsion spring 352, a second portion of the park cam 354 and a retaining ring 356. The second shift park assembly 360 includes a second shift shaft 362. Mounted on the second shift shaft 362 is a detent star 364, a third sector gear 366, a fourth sector gear 368, and O-ring 370, a thrust washer 372 and a snap ring 374. The first shift shaft assembly 336 and the second shift park assembly 360 assembled can be seen at least in FIGS. 3 through 5.

In embodiments, a linkage of some type such as a cable, linkage rod, etc. connects into bell crank 340. When the linkage is pulled, the bell crank 340 rotates first shift shaft 346 which is attached via spline to first sector gear 344. This sector gear 344 is attached to third sector gear 366 which is splined to second shift shaft 362 which in turn is splined to fourth sector gear 368. The fourth sector gear 368 meshes with second sector gear 348 back on first shift shaft 346. Second sector gear 348 is not rotationally constrained to first shift shaft 346 so it can rotate relative to it. Second sector gear 348 is attached to first portion park cam 350a so when second sector gear 348 rotates, first portion park cam 350a rotates with it. Park cam 350a is connected to second portion park cam 354 through a torsion spring 352. The torsion spring 352 is used so that when the park cams 350a rotates, if park pawl 334 hits the top of a dog clutch on park shift dog 258, the torsion spring 352 will load up. Due to this loading, when the park shift dog 258 rotates to a point where the park pawl 334 can fall into a notch, the torsion spring completes rotation of second portion park cam 354 which cams the park pawl 334 about park rail shaft 332 to engage dog teeth in park shift dog 258 completing the shift to park without any additional input from the driver. The park shift rail 332 is locked into a gear case (not shown) so when the park pawl 334 locks into the park shift dog 258, the counter shaft 222 is locked to the gear case and dual clutch transaxle 120 is in park. This sub-assembly also includes detent star 364 which works with a detent pawl (not shown) that is a spring loaded detent mechanism that can be a plunger style, pawl style or any other mechanism to make a detent shift force noticeable to the driver. This detent star and loading mechanism is designed such that when the detent plunger or pawl rotates over a finger of the detent star 364 it will rotate the first portion park cam 350a and load the torsion spring 352 and hold the torsion spring 352 in a loaded state. As mentioned previously, if the park pawl 334 can hit the opening in park shift dog 258 the park pawl will drop in and you have park. If the park pawl 334 does not hit the opening in the dog clutch in park shift dog 258, the torsion spring will load up so when the park shift dog rotates and the park pawl can hit the opening in the dog clutch in park shift dog 258, it will drop in and engage park.

Figure 6D:
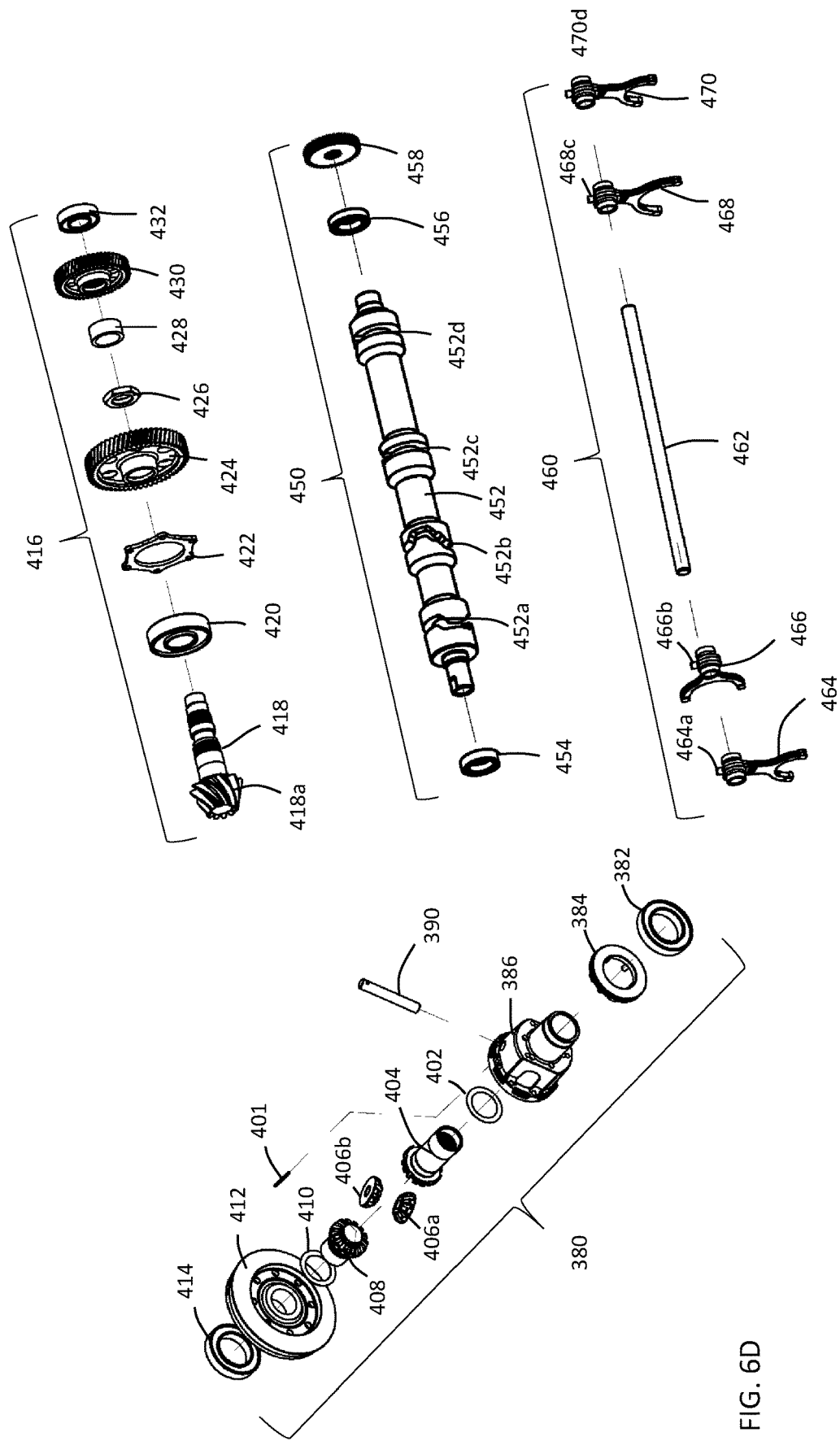

FIG. 6D further shows other unassembled components of the dual clutch transaxle 100. FIG. 6D illustrates an output differential assembly 380, a gear assembly 416, a shift drum assembly 450 and a shift fork assembly 460. The output differential assembly 380 includes a bearing 382, an engagement dog 384, a differential carrier 386, a washer 402, a first output gear 404. The output differential assembly 380 further includes a first bevel pinion 406a, a second bevel pinion 406b, a differential pin 390 to hold the first bevel pinion 406a and second bevel pinion 406b to differential carrier 386, a second output gear 408, a washer 410, a dowel pin 401, a ring gear 412 and a bearing 414. The output differential assembly assembled is best illustrated in FIG. 5. The unassembled gear assembly 416 of FIG. 6D includes a bevel pinion 418 with a bevel pinion gear 418a. Mounted on a shaft of the bevel pinion is a bearing 420, a bearing cover 422, a third stage gear 424, a pinion bearing nut 426, a spacer 428, a forward gear 430 and bearing 432. An assembled gear assembly 416 is best illustrated in FIG. 2.

An unassembled shift drum assembly 450 is also illustrated in FIG. 6D. The shift drum assembly 450 includes a shift drum 452. The shift drum 452 includes a plurality of cam tracks. In the example embodiment shown the plurality of cam tracks includes a first cam track 452a, a second cam track 452b, a third cam track 452c and a fourth cam track 452d. Mounted on a first end of the shift drum 452 is a bearing 454. Mounted on a second end of the shift drum 452 is a bearing 456 and a shift drum gear 458. The shift fork assembly 460 includes a shift rail 462 upon which a first shift fork 464, a second shift fork 466, a third shift fork 468 and fourth shift fork 470 is mounted. Each shift fork 464, 466, 468 and 470 includes a follower tab that is received in an associated cam track of the shift drum 452 when assembled. In particular, the first shift fork 464 includes a first follower tab 464a which is received in first cam track 452a of the shift drum 452. The second shift fork 466 includes a second follower tab 466b that is received in the second cam track 452b of the shift drum 452. The third shift fork 468 includes a third follower tab 468c that is received in the third cam track 452c of the shift drum 452. Moreover, the fourth shift fork 470 includes a fourth follower tab 470d that is received in the fourth cam track 452d of the shift drum 452. The assembled shift drum assembly 450 and the shift fork assembly 460 is best illustrated in FIG. 2.

Torque produced by and engine 502 (illustrated in FIG. 9) is provided to the dual clutch dual clutch assembly 120 which in turn provides the torque to the input shaft assembly 140 as best illustrated in FIG. 7. In particular, the first inner clutch gear 122a of the first inner clutch shaft 122 is engaged with the input shaft second driven gear 196 of the input shaft assembly 140. The first inner clutch shaft 122 is engaged with the first clutch 121a of the dual clutch 121. The input shaft second driven gear 196 of the input shaft assembly 140 is engaged with the first inner clutch gear 122a of the dual clutch 121. Hence, torque through the first clutch 121a is provided to the second outer input shaft 144 of the input shaft assembly 140. The second outer clutch gear 124c of second outer clutch shaft 124 of the dual clutch assembly 120 is engaged with the inner input shaft first driven gear 143 of the first inner input shaft 142 of the input shaft assembly 140. Hence, torque through the second clutch 121b is provided to the first inner input shaft 142 of the input shaft assembly 140. The dual clutch 121 may be activated electrically or via hydraulic system.

Figure 2:
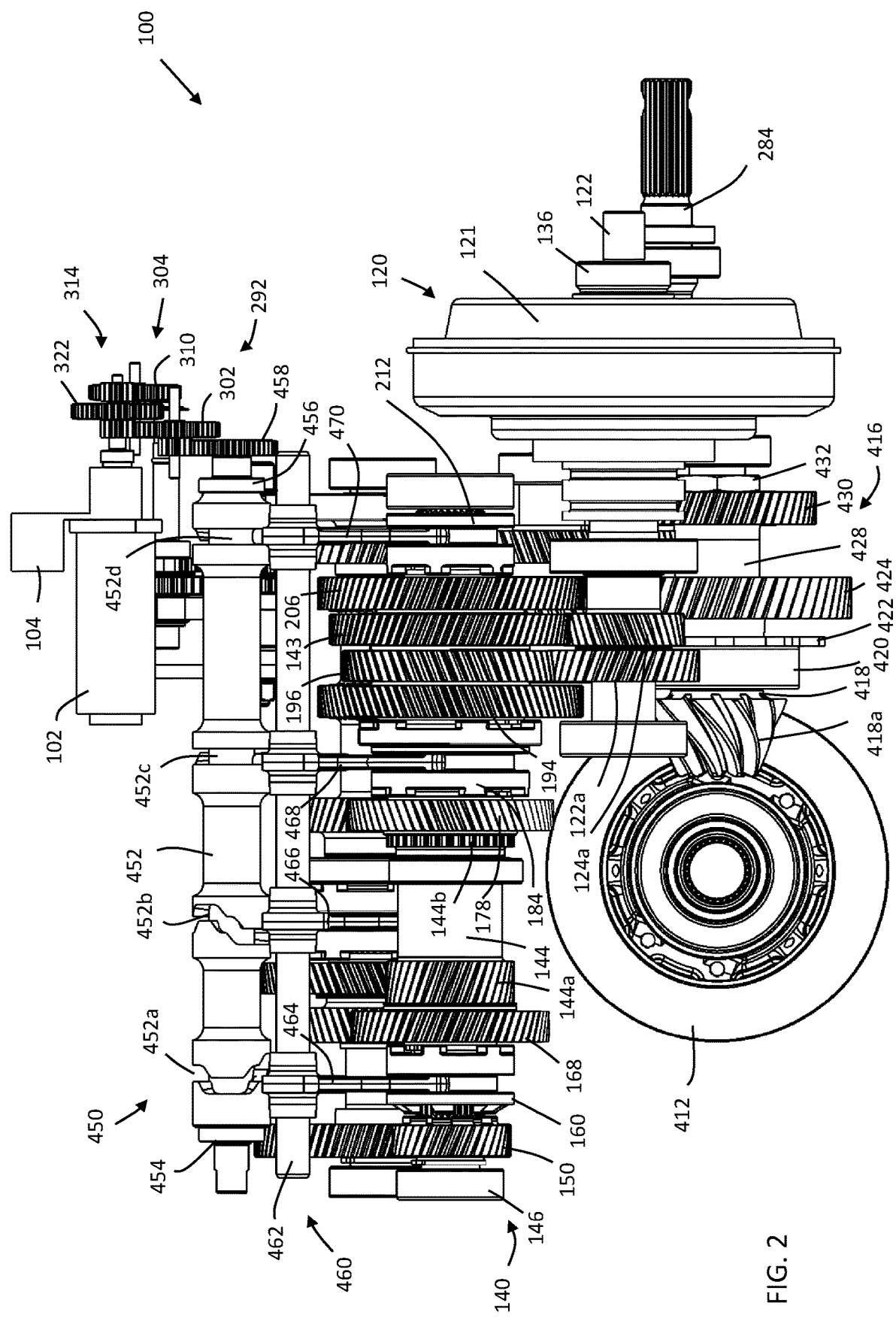
FIG. 2 is a first side view of the dual clutch transaxle of FIG. 1.

Referring to FIG. 2, during operation, when the electric motor is activated to make a shift, the shift drum 452 rotates via shift drum gear 458 engaging the cluster gears 322, 310 and 302 which are in turn operationally coupled to the first pinion gear 324 and the motor shaft 316 of the electric motor 102. As the shift drum 452 rotates, the follower tabs 464a, 466b, 468c and 470d received in the respective cam tracks 452a, 452b, 452c and 452d cause the respective shift forks 464, 466, 468 and 470 to move. The cam profile of each respective cam track 452a, 452b, 452c and 452d are designed to accomplish a desired shift change of the dual clutch transaxle 100 as the shift drum 452 rotates.

In the example embodiment of the dual clutch transaxle 100, the first shift fork 464 is engaged with the first shift dog 160 of the input shaft assembly 140. The first shift dog 160 selectively locks either the first drive gear 150 or the third drive gear 168 with rotation of the first inner input shaft 142 depending on the location of the first shift fork 464 which is controlled by the shift drum 452 as discussed above. The second shift fork 466 is engaged with the second shift dog 240 on the counter shaft 222 of the counter shaft assembly 220. The second shift dog 240 selectively locks rotation of counter shaft 222 with the rotation of either the second driven gear 236 or the sprocket 250. The third shift fork 468 is engaged with the third shift dog 184 of the input shaft assembly 140. The third shift dog 184 selectively locks either the fourth drive gear 178 or the sixth drive gear 194 with the rotation of the second outer input shaft 144 depending on the location of the third shift fork 468 which is controlled by the shift drum 452 as discussed above. Finally, the fourth shift fork 470 is engaged with the fourth shift dog 212. The fourth shift dog 212 selectively locks the fifth drive gear 206 to the rotation of the first inner input shaft 142.

As best illustrated in FIG. 8, the interaction between the input shaft assembly 140 and the counter shaft assembly 220 is described. As illustrated, the first drive gear 150 of the input shaft assembly 140 is engaged with the first driven gear 230 of the counter shaft assembly 220. The third drive gear 168 of the input shaft assembly 140 is engaged with the third driven gear 234 of the counter shaft assembly 220. The second drive gear 144a of the input shaft assembly 140 is engaged with the second driven gear 236 of the counter shaft assembly 220. The reverse drive sprocket 144b of the input shaft assembly 140 is engaged with the chain 252 which is in turn engaged with sprocket 250 of the counter shaft assembly 220. The fourth drive gear 178 is engaged with the fourth driven gear 223 of the counter shaft assembly 220.

The sixth drive gear 194 of the input shaft assembly 140 is engaged with the sixth driven gear 224 of counter shaft assembly 220. Finally, the fifth drive gear 206 of the input shaft assembly 140 is engaged with the fifth driven gear 225 of the counter shaft assembly 220.

Further operational connections are described below. As best illustrated in FIG. 3, the counter shaft output drive gear 256 of the counter shaft assembly 220 is engaged with the second stage gear 276 of the idler assembly 270. The idler gear 272a of the idler assembly 270 is engaged with the third stage gear 424 of the gear assembly 416. The forward gear 430 of the gear assembly in turn is engaged with the front output gear 284a of the front output assembly 282. The bevel pinion gear 418a of the bevel pinion 418 of the gear assembly 416 engaging the ring gear 412 of the output differential assembly 380. Although the output assembly 380 is described as an output differential assembly, other types of the output assemblies could be used such as a lock spool assembly.

Referring to FIGS. 7 and 8 a description of changing gears from second gear to third gear is provided to better help in the understanding of embodiments. Torque from an engine comes into the dual clutch 121 from a torsional damper through a connection of the torque clutch input shaft 138 as illustrated in FIG. 7. First clutch 121a will be closed and locked at this point. The second clutch 121b will be open. Shift dog 240, illustrated in FIG. 8, will be engaged with the second driven gear 236. The power path at this point is through the torque clutch input shaft 138, first clutch 121a, inner end clutch splines 122b, first inner clutch shaft 122, input shaft second driven gear 196, second drive gear 144a, second driven gear 236, second shift dog 240, counter shaft 222 and then through the rest of the dual clutch transaxle 100 to the output differential assembly 380 and the front output assembly (second output assembly) 282. When it is time to shift into third gear, initially everything stays as listed above except the shift drum 452 of the shift drum assembly 450 rotates to a third gear per selection. The first shift dog 160 moves in response to the rotation of the shift drum 452 to engage the third gear 168. This is preselection since all the power is still going through the second gear set as discussed above. Hence at this point no torque is transmitted to the third drive gear 168 because the second clutch 121b is still open at this point. In a few milliseconds, the first clutch 121a opens as the second clutch 121b closes. This allows for a very rapid shift from second gear to third gear. The power path is now through the torque clutch input shaft 138, second clutch 121b, outer end clutch splines 124b, second outer clutch shaft 124, inner input shaft first driven gear 143, first inner input shaft 142, first shift dog 160, third drive gear 168, third driven gear 234, counter shaft 222 and then through the rest of the dual clutch transaxle 100 to the output differential assembly 380 and the front output assembly (second output assembly) 282. The use of the dual clutch dual input shaft arrangement ensures that torque is always maintained to the ground during the handoff from the first clutch 121a to the second clutch 121b. The opening and closing of the first and second clutches 121a and 121b may be controlled via a control system that implements an electronic, hydraulic or combination system. For example, in an embodiment, an electronic controller may be used that monitors inputs such as, but not limited to, engine speed, throttle position and vehicle speed and decides when to shift based on those inputs. When it is time to shift, the electronic controller then directs a hydraulic system (or electronic system in an alternative embodiment) to open and close the clutches.

Figure 1:
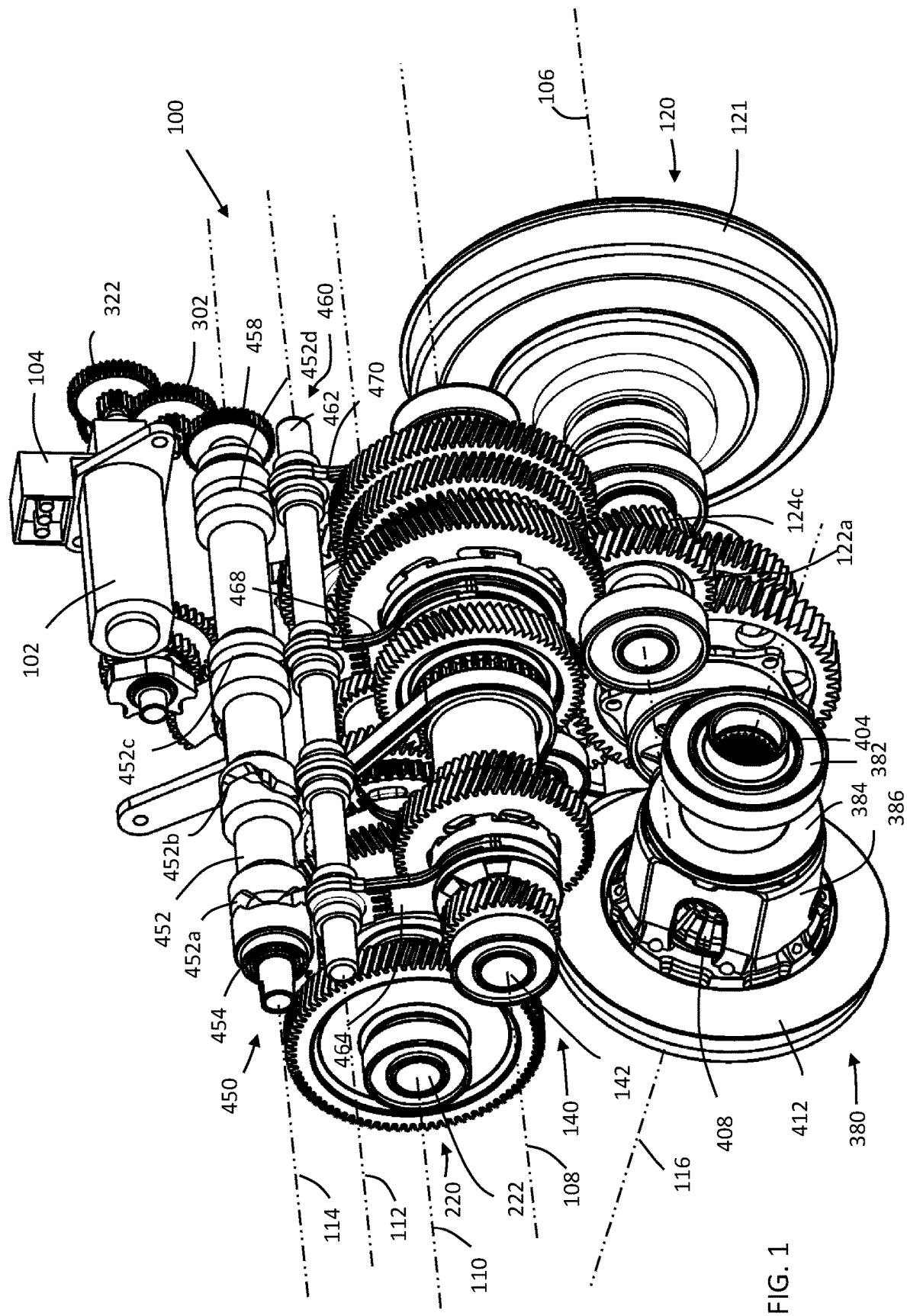
FIG. 1 is a first side perspective view of a dual clutch transaxle of one embodiment of the present invention.

Referring to FIG. 1, a feature of embodiments is that an input shaft axis 108 of the input shaft assembly 140 is offset from a dual clutch axis 106 of the dual clutch assembly 120. FIG. 1, further illustrates a counter shaft axis 110 of the counter shaft assembly 220, a shift rail axis 112 of the shift fork assembly 460, a shift drum axis 114 of the shift drum assembly 450 and the differential axis 116 of the output differential assembly 380. In the example embodiment of FIG. 1, the dual clutch axis 106, the input shaft axis 108, the counter shaft axis 110 are parallel with each other. In addition, they are transverse to the differential axis 116. One other feature of the dual clutch transaxle 100 is that as illustrated in FIG. 1 is that the input shaft assembly 140 and the counter shaft assembly 220 is position above the output differential assembly 380 to achieve a compact configuration. In addition, in embodiments, no gear reduction is needed coming out of the dual clutch assembly 120. Although a nested dual clutch assembly 120 is illustrated in the Figures, other types of dual clutch assemblies such as, but not limited to, serial and parallel dual clutch assemblies are used in other embodiments.

One other feature of the dual clutch transaxle 100, and other embodiments discussed below, is that their configurations allows for an easy change of the gear ratio. In multi speed transmission, it is desired to have ratio splits to be consistent or close to consistent throughout the different transaxle variants. Ratio splits are calculated by taking the gear ratio in the second gear and dividing by the gear ratios in the first gear. The gear ratio of the third gear is divided by the gear ratio in the second gear and so on. To change the top speed of a transaxle or to change the RPM, there need to be a place to change the ratios of the gearing. The offset configuration of the dual clutch assembly 120 and the input shaft assembly 140, a simple swap out of the first inner clutch assembly gear 122a and the corresponding outer input shaft second driven gear 196 along with the second outer clutch gear 124c and the corresponding inner input shaft first driven gear 143 changes the overall ratio of the transaxle 100 while keeping the same ratio splits from first, second and third gear and so on. This is a much easier, fast and lower production cost than having to change all of the shifting gears on the input shafts 142 and 144 and the counter shaft 222. Further in an embodiment, the gearing of the dual clutch transaxle 100 may also be changed by changing the gearing in an idler set of the idler assembly 270 further downstream from the counter shaft assembly 140. Hence, if a different gear ratio is needed for a different application, this can be done by simply swapping out one more gears as described above. Accordingly, the same vehicle platform with the dual clutch transaxle 100 could be used for engines running at different RPMs such is typically the case with gasoline and diesel engines to achieve desired vehicle characteristics by swapping out the gears.

Figure 9:
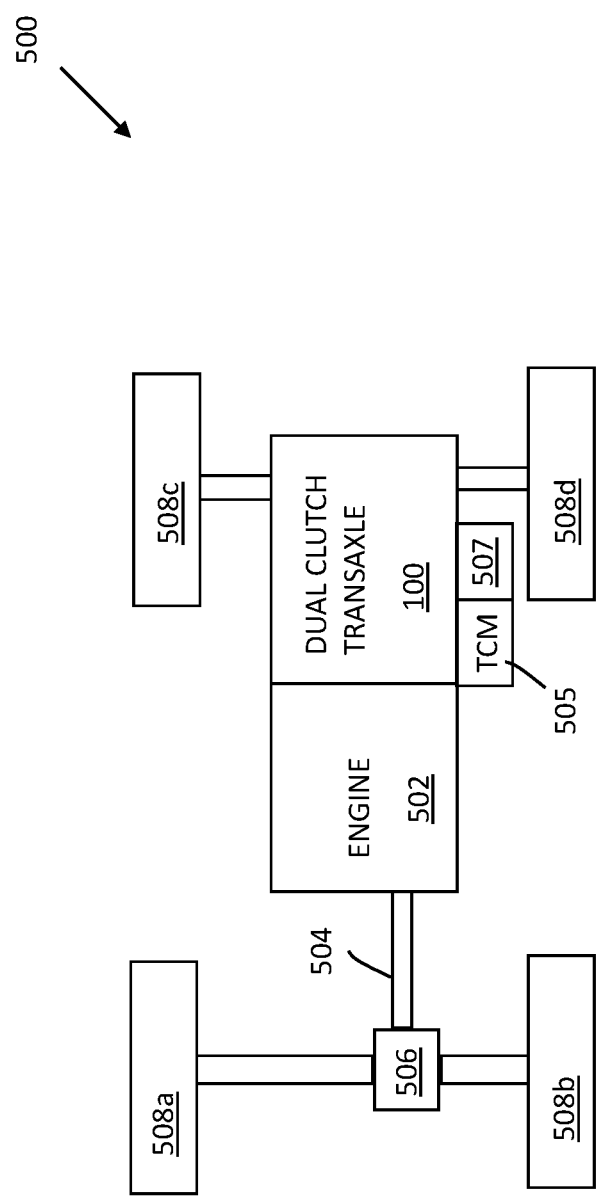
FIG. 9 is a vehicle of an embodiment implementing the dual clutch transaxle of FIG. 1.

FIG. 9 illustrates a block diagram of a vehicle 500 of one embodiment implementing the dual clutch transaxle 100 described above. The vehicle 500 includes an engine 502 that provides torque to the dual clutch transaxle 100. As described above, the torque is provided to the dual clutch 121 typically via crankshaft connection to the engine. Torque is provide to rear wheels 508c and 508d via the output differential assembly 380 of the dual clutch transaxle 100. The torque is provided to a front differential 506 through a front drive shaft 504 operationally coupled to the front output assembly 282 of the dual clutch transaxle 100. Torque is provided to the front wheels 508a and 508b via the front differential 506. Further illustrated in FIG. 9 is a transmission control module 505 and a clutch actuation system 507. The clutch actuation system 507 may be an electronic or hydraulic or combination electric/hydraulic system that opens and closes the clutches 121a and 121b of the dual clutch assembly 120. The transmission control unit 505 controls operation of the clutch actuation system 507 and the shift drum assembly 450 in an embodiment. The transmission control unit 505, in one embodiment, includes one or more processing units that implement instructions, such as an algorithm, stored in a memory to cause the shift drum to rotate and the clutches to open and close during a shift operation of the dual clutch transaxle 100.

Figure 10:
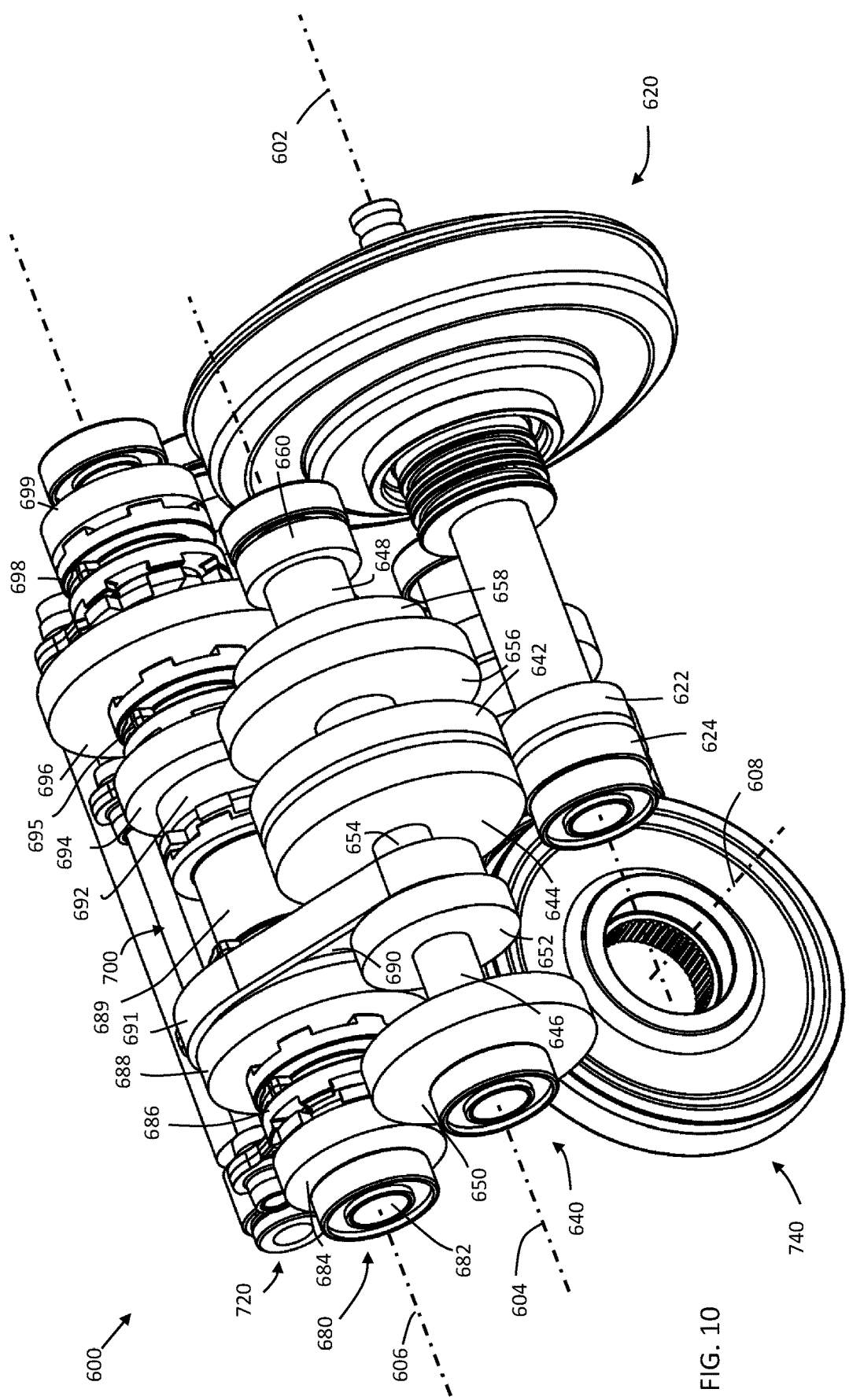
FIG. 10 is a first side perspective view of dual clutch transaxle of anther embodiment.
Figure 11A:
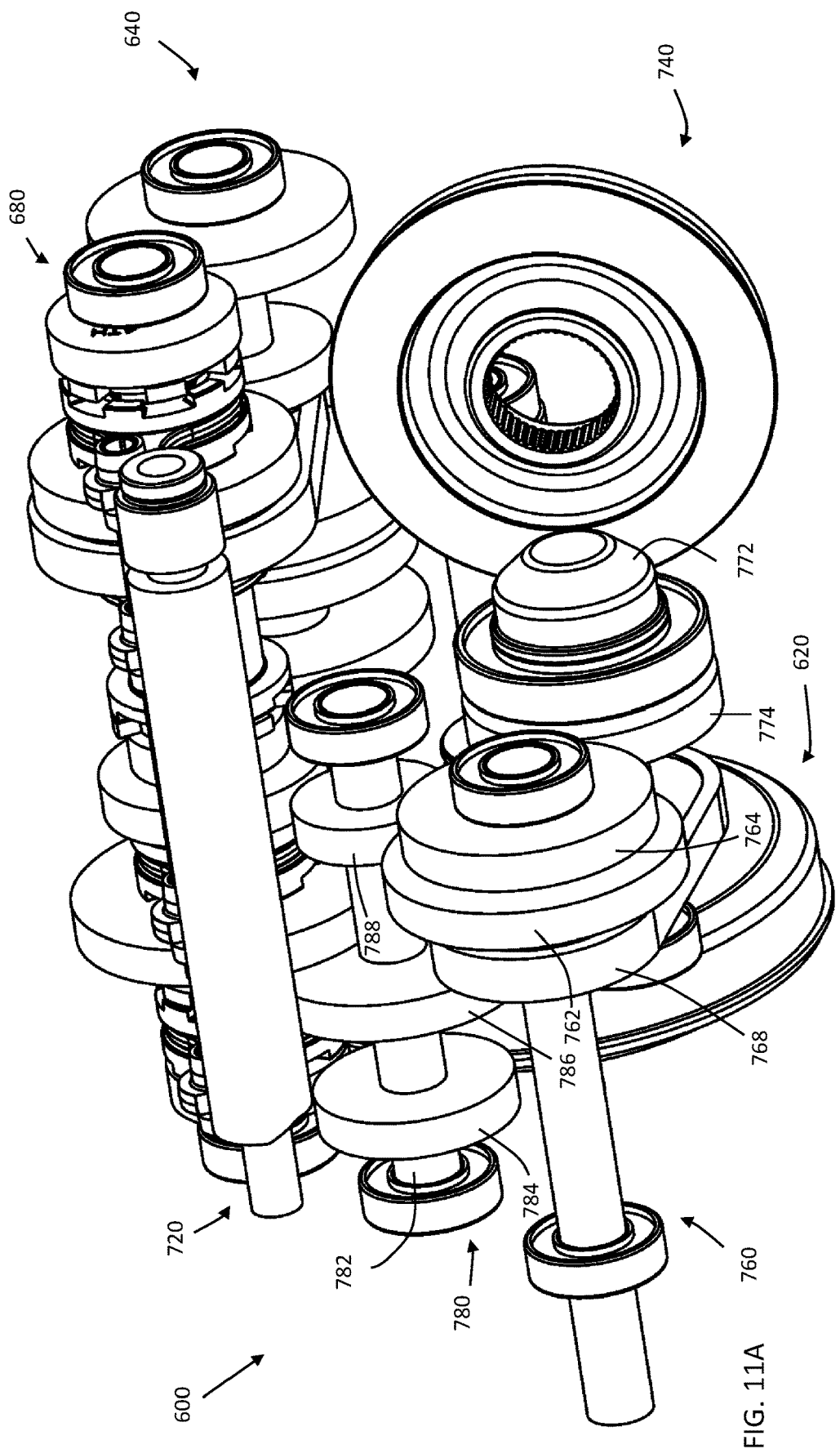
FIG. 11A is a second side perspective view of the dual clutch transaxle of FIG. 10.
Figure 11B:
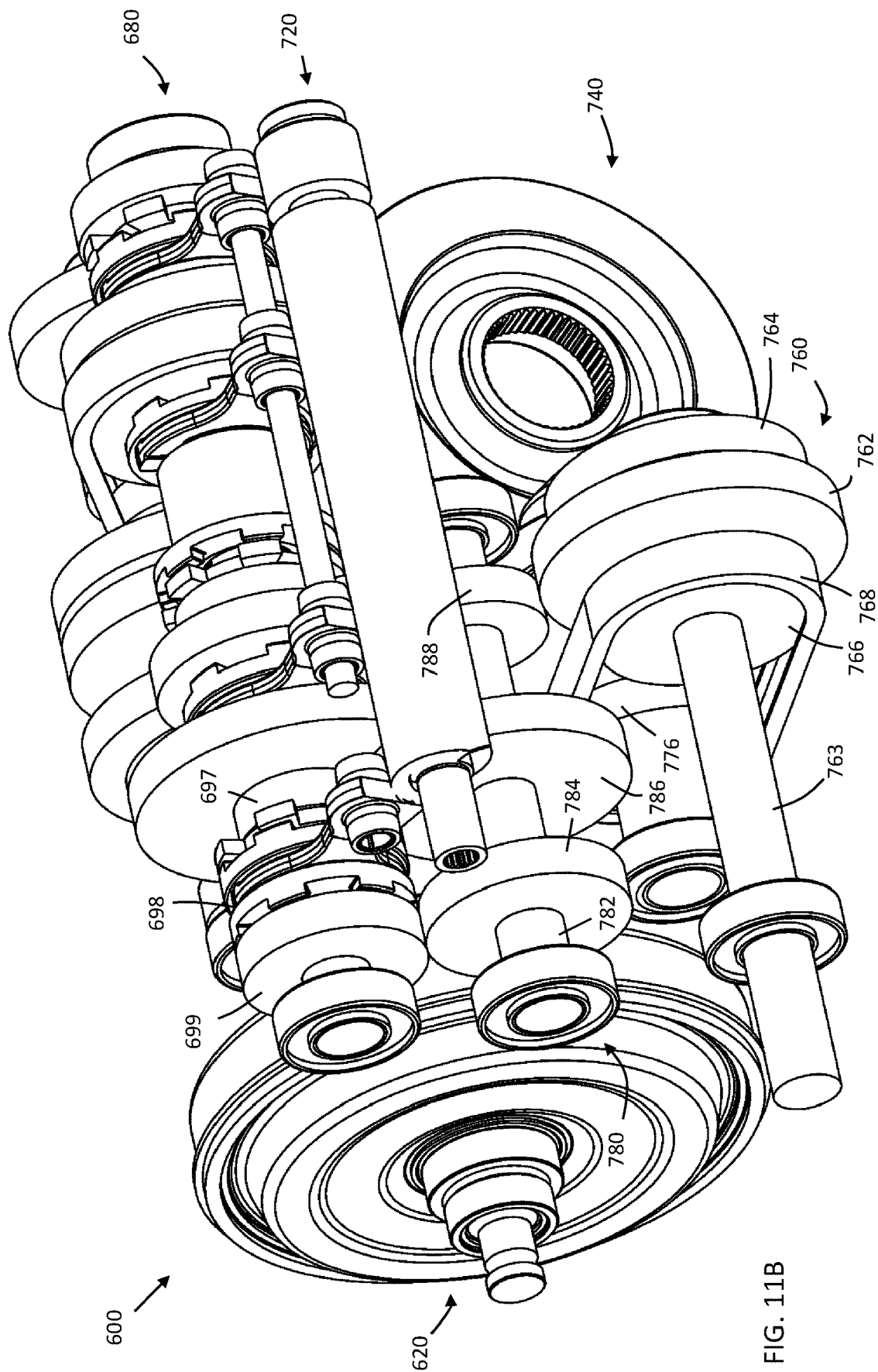
FIG. 11B is another second side perspective view of the dual clutch transaxle of FIG. 10.
Figure 12:
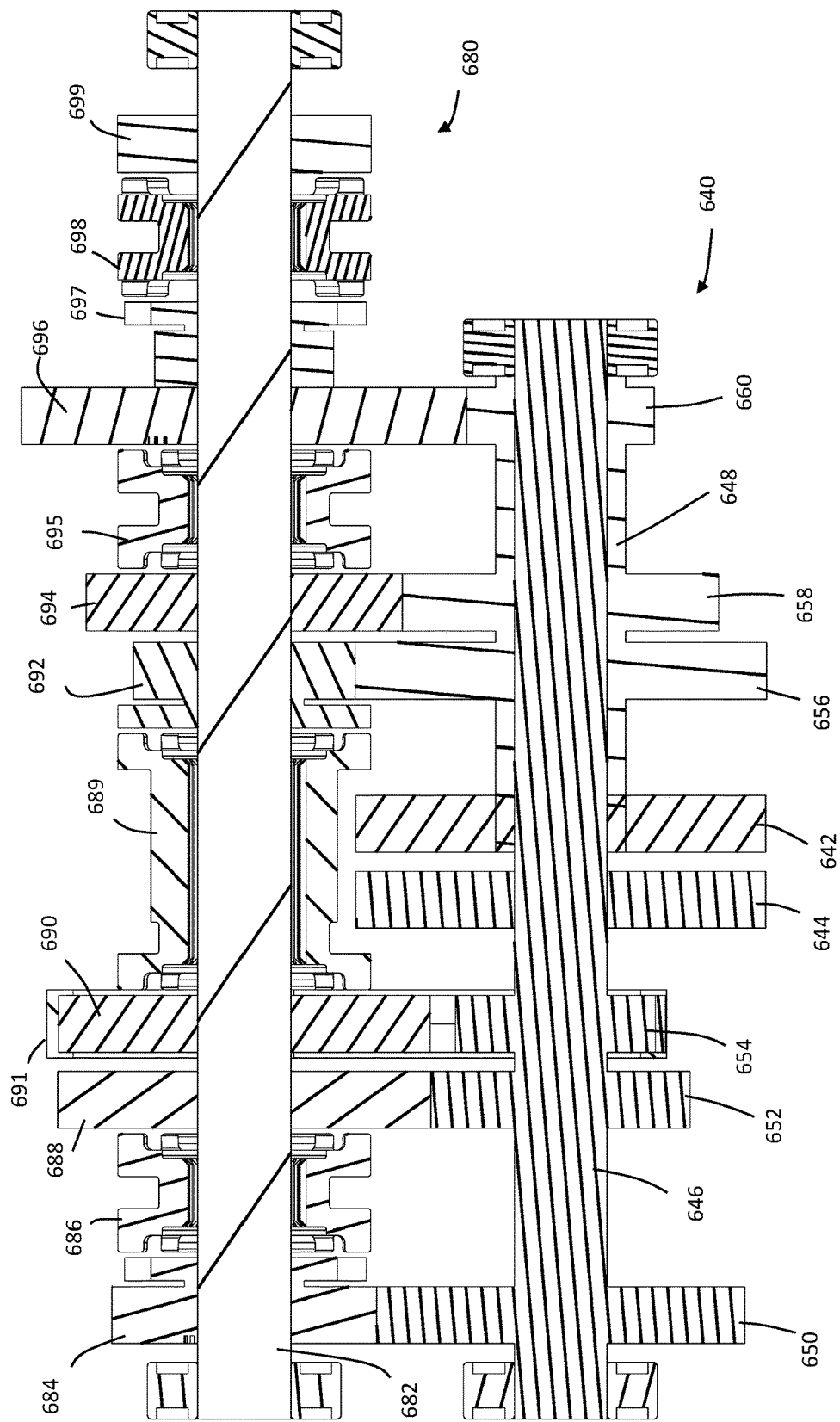
FIG. 12 is a partial cross-sectional top view of the dual clutch transaxle of FIG. 10 illustrating how the input shaft interacts with the countershaft in this embodiment.

Another embodiment of a dual clutch transaxle 600 is illustrated in FIGS. 10 through 12. This embodiment also includes a dual clutch assembly 620, and input shaft assembly 640, a counter shaft assembly 680, a shift fork assembly 700, a shift drum assembly 720, an output differential assembly 740, a front output assembly 760 and a lay shaft assembly 780. Similar to the dual clutch transaxle 100 described above, the dual clutch transaxle 600 includes a dual clutch axis 602, an input shaft axis 604 and a counter shaft axis 606 that that are all transverse to a differential axis 608. Moreover the dual clutch axis 602 is spaced from the input shaft axis 604 and the counter shaft axis 606. In addition, the output differential assembly 740 is also positioned under the counter shaft assembly 680 and the input shaft assembly 640. In the embodiment of FIG. 10, however, the shift fork assembly 700 and the shift drum assembly 720 are positioned on the other side of the counter shaft assembly 680 away from the input shaft assembly 640.

The dual clutch assembly 620 includes a first clutch drive gear 622 and a second clutch drive gear 624. The first clutch drive gear 622 engages a first driven input gear 642 of the input shaft assembly 640 and the second clutch drive gear 624 engages a second driven input gear 644 of the input shaft assembly 640 to convey torque from an engine to the input shaft assembly 640. Similar to the dual clutch transaxle 100 discussed above, the dual clutch assembly 620 includes an inner shaft and an outer shaft to selectively provide torque to the first clutch drive gear 622 and the second clutch drive gear 624.

Interaction between the input shaft assembly 640 and the counter shaft assembly 680 is shown in FIG. 12. The input shaft assembly 640 includes a first inner input shaft 646 upon which a second outer input shaft 648 is mounted. The first inner input shaft 646 is driven by the second driven input gear 644. Mounted on the first inner input shaft 646 is a fourth drive gear 650, a second drive gear 652 and a reverse drive sprocket 654. Mounted on the second outer input shaft 648 is a fifth drive gear 656, a third drive gear 658 and a first drive gear 660. The counter shaft assembly 680 includes a fourth driven gear 684 that is engaged with the fourth drive gear 650 of the input shaft assembly 640 and a second driven gear 688 that is engaged with the second drive gear 652 of the input shaft assembly 640. A first shift dog 686 is mounted on the counter shaft 682 to selectively lock rotation the counter shaft 682 with rotation of either the fourth driven gear 684 or the second driven gear 688. The counter shaft assembly 680 also includes a reverse driven sprocket 690 that is coupled to the reverse drive sprocket 654 of the input shaft assembly 640 via chain 691. A fifth driven gear 692 of the counter shaft assembly 680 is engaged with the fifth drive gear 656 of the input shaft assembly 640. A third driven gear 694 is engaged with the third drive gear 658 of the input shaft assembly 640. A first driven gear 696 is engaged with the first drive gear 660 of the input shaft assembly 640. A second shift dog 695 mounted on the counter shaft 682 selectively locks rotation of the counter shaft 682 with rotation of either the third driven gear 694 or the first driven gear 696. A fourth shift dog 689 mounted on the counter shaft 682 selectively locks rotation of the counter shaft 682 with rotation of either the fifth driven gear 692 or the reverse driven sprocket 690. This embodiment of the counter shaft assembly 680 further includes a low range drive gear 697, a high range drive gear 699 and a third shift dog 698 that selectively locks rotation of either the low range drive gear 697 or the high range drive gear 699 with the rotation of the counter shaft 682. Hence, in this embodiment, the dual clutch transaxle provides 10 different forward gears (1 through 5 low and 1 through 5 high) and 2 reverse gears (1 low and 1 high).

Referring to FIGS. 11A and 11B, the high range drive gear 699 of the counter shaft assembly 680 is engaged with a high range driven gear 784 of the lay shaft assembly 780 and the low range drive gear 697 of the counter shaft assembly 680 is engaged with a low range driven gear 786 of the lay shaft assembly 780. The lay shaft assembly 780 further include a lay shaft 782 and a lay shaft drive gear 788. The lay shaft drive gear 788 mates with a drop gear 762 of the front output assembly 760. The drop gear 762 is fixed to a second stage drive gear 764. Both the drop gear 762 and the second stage drive gear 764 are axially and radially but not rotationally constrained to a front output shaft 763 of the front output assembly 760. The second stage drive gear mates with a second stage driven gear 774 which is constrained to a bevel pinion shaft 772. Bevel pinion shaft 772 is further in operationally connected to the ring gear of the output differential assembly 740. Drive sprocket 776 is also operationally connected to the bevel pinion shaft 772. A chain 768 transmits power from the drive shaft sprocket 776 to the driven sprocket 766 which is operationally connected to front output shaft 763. The connection between the bevel pinion shaft 772 may be a standard bevel set with the pinion on the same axis as a ring gear of the output differential assembly 740 or the pinion axis may be above or below the ring gear axis of the differential of the output differential assembly 740. This layout solves packaging issues by offsetting the input shafts 646 and 648 away from a crankshaft of the motor and above a ring gear and differential. The drop gears to the front driveshaft allow for the packaging gear sets without any extra shafts while still allowing access to a pinion on the forward side of the ring gear. The pinion mates with the ring gear either as a bevel set or hypoid set to change the power flow from longitudinal (front to back) to transversal (left or right). With the ring gear attached to the differential of the output differential assembly 740, drive shafts plug into the differential to deliver power to the wheels. This design may also work with the spool rear housing where there would not be a differential in the system. In an example embodiment, the axis of the input shaft, counter shaft and the lay shaft run above the axis of the rear gear. Moreover, in an embodiment, a silent chain is run between the lay shaft 782 and front output assembly. A mesh gear could also be used depending on the direction of rotation desired. Activation of the third shift dog 698 may be done with the shift drum assembly 720 or may be done in a separate manner such as with a cable controlled by an operator or by a separate electric motor used to move an associated shift fork to shift the third shift dog 698. In another embodiment, a solenoid that slides the associated shift fork is used to shift it.

Figure 13:
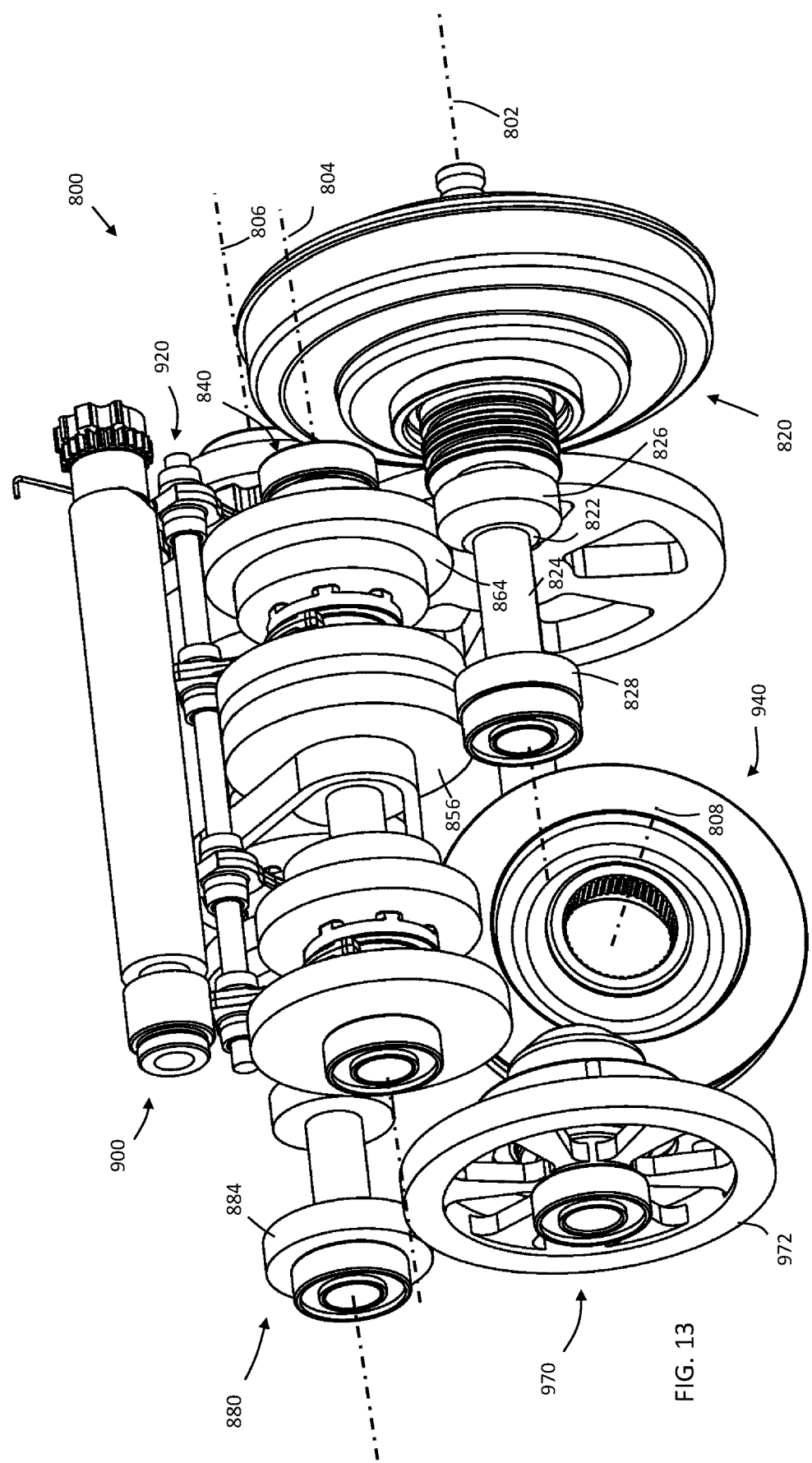
FIG. 13 is a first side perspective view of a dual clutch transaxle of another embodiment.
Figure 14:
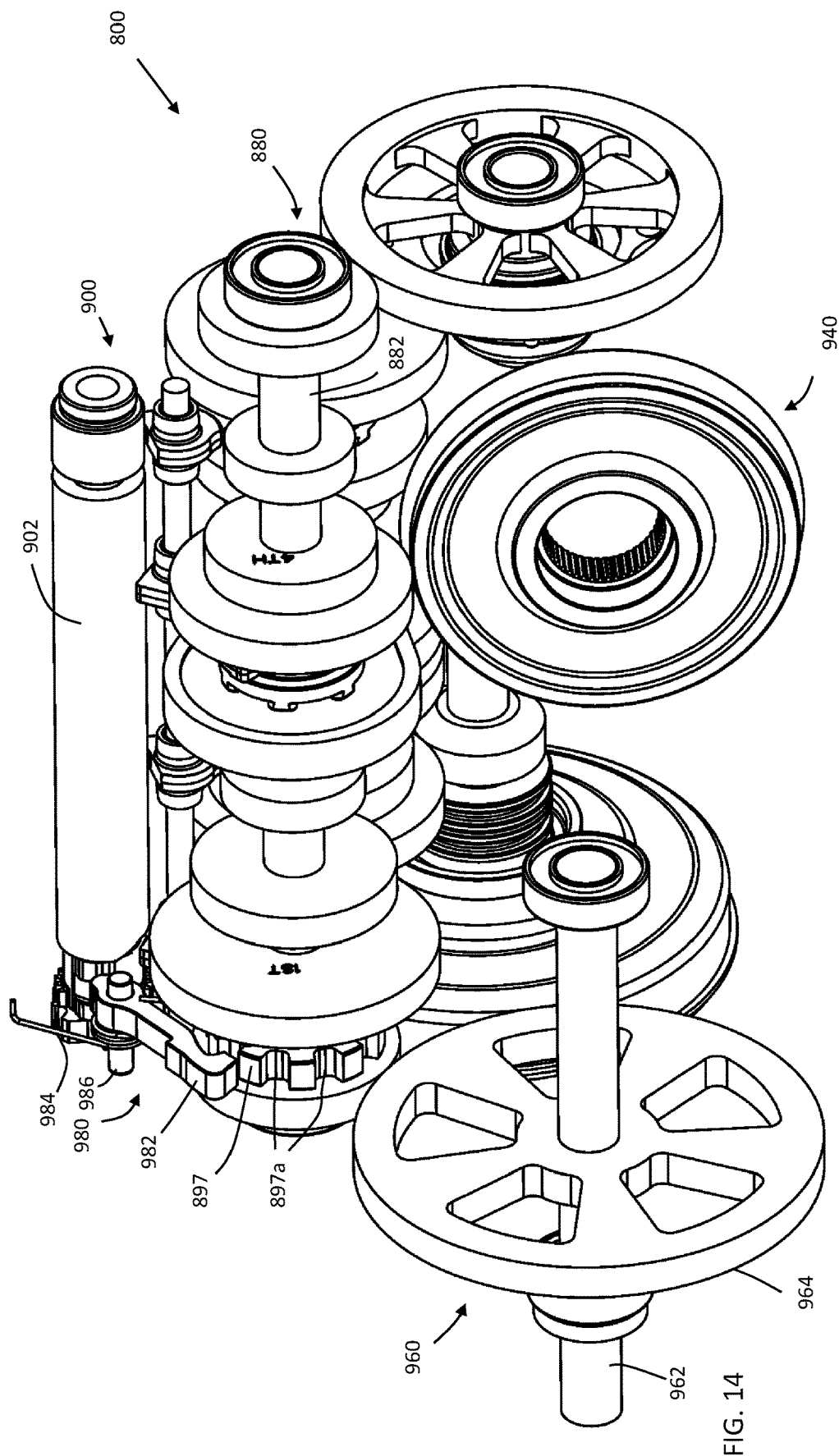
FIG. 14 is a second side perspective view of the dual clutch transaxle of FIG. 13.
Figure 15:
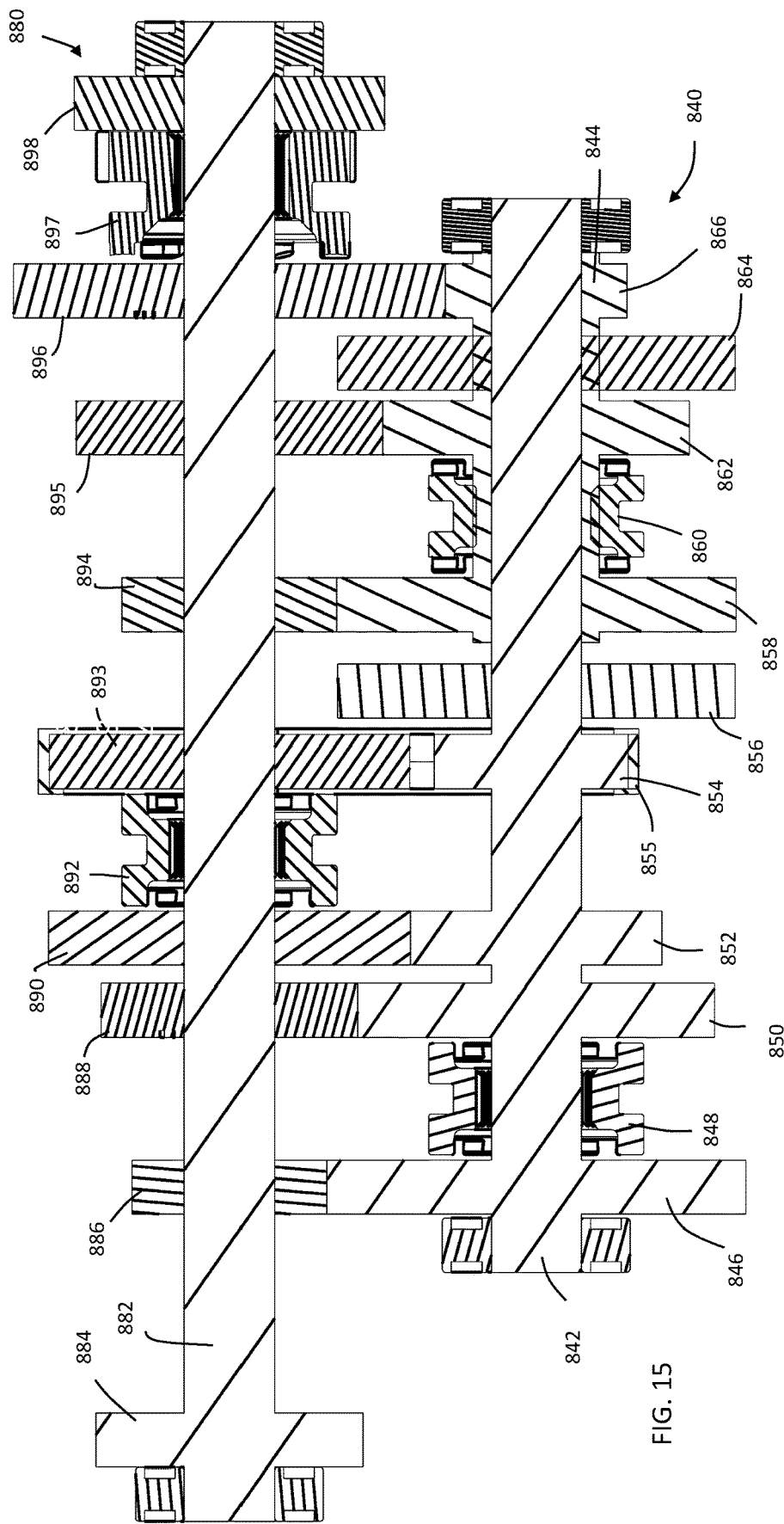
FIG. 15 is a partial cross-sectional top view of the dual clutch transaxle of FIG. 13 illustrating how the input shaft interacts with the countershaft in this embodiment.

FIGS. 13 through 15 illustrate yet another embodiment of a dual clutch transaxle 800. Dual clutch transaxle 800 includes a dual clutch assembly 820, and input shaft assembly 840, a counter shaft assembly 880, a shift drum assembly 900, a shift fork assembly 920, and output differential assembly 940, a front output assembly 960, a rear output assembly 970 and a pawl park assembly 980. Similar to the dual clutch transaxles 100 and 600 described above, the dual clutch transaxle 800 includes a dual clutch axis 802, an input shaft axis 804 and a counter shaft axis 806 that that are all transverse to a differential axis 808. Moreover the dual clutch axis 802 is a spaced distance from the input shaft axis 804 and the counter shaft axis 806. In addition, the output differential assembly 940 is also positioned under the counter shaft assembly 880 and the input shaft assembly 840. In this example embodiment of dual clutch transaxle 800, the rear output assembly 970 has a rear output driven gear 972 that is engaged with a rear output drive gear 884 of the counter shaft assembly 880. The rear output driven gear 972 is used to drive the output differential assembly 940. In an embodiment, the rear output assembly 970 includes a pinion that mates with a ring gear of the output differential assembly 940 to transfer torque to the output differential assembly 940.

The dual clutch assembly 820 of the dual clutch transaxle 800 includes nested output shafts. Coupled to a first output shaft 822 of the dual clutch assembly 820 is a first torque drive gear 826. Coupled to a second output shaft 824 of the dual clutch assembly 820 is a second torque drive gear 828. The first torque drive gear 826 is engaged with a first torque driven gear 864 of the input shaft assembly 840. The second torque drive gear 828 is engaged with a second torque driven gear 856 of the input shaft assembly 840. The first torque driven gear 864 is coupled to a second outer input shaft 844 of the input shaft assembly 840. The second torque driven gear 856 is coupled to a first inner input shaft 842 of the input shaft assembly 840. Similar to the transaxle embodiments discussed above, the gearing ratio of the dual clutch transaxle 800 can be adjusted by simply swapping out the gearing set including the first torque drive gear 826 and the first torque driven gear 864 and the second gearing set including the second torque drive gear 828 and second torque driven gear 856 of the dual clutch assembly 820 and the input shaft assembly 840 respectively.

FIG. 15 illustrates how the input shaft assembly 840 interacts with the counter shaft assembly 880. A sixth drive gear 846 of the input shaft assembly 840 is engaged with a sixth driven gear 886 mounted on a counter shaft 882 of the counter shaft assembly 880. A fourth drive gear 850 of the input shaft assembly 840 is engaged with a fourth driven gear 888 of the counter shaft assembly 880. A first shift dog 848 mounted on the first inner input shaft 842 of the input shaft assembly 840. The first shift dog 848 is positioned to selectively lock either the sixth drive gear 846 or the fourth drive gear 850 to the rotation of first inner input shaft 842 of input shaft assembly 840. The input shaft assembly 840 further includes a second drive gear 852 that is engaged with a second driven gear 890 of the counter shaft assembly 880. A reverse drive sprocket 854 is mounted on the first inner input shaft 842 of the input shaft assembly 840. The reverse drive sprocket 854 is mated with a reverse driven sprocket 893 of the counter shaft assembly 880 via chain 855. Mounted on the second outer input shaft 844 of the input shaft assembly 840 is a fifth drive gear 858. The fifth drive gear 858 is engaged with a fifth driven gear 894 of the counter shaft assembly 880. A third drive gear 862 of the input shaft assembly 880 is engaged with a third driven gear 895 of the counter shaft assembly 880. A second shift dog 860 is mounted on the second outer input shaft 844 of the input shaft assembly 840 to selectively lock either the fifth drive gear 858 or the third drive gear 862 to the rotation of the second outer input shaft 844 of the input shaft assembly 840. Further mounted on the second outer input shaft 840 is a first drive gear 866 that is engaged with the first driven gear 896 of the counter shaft assembly 880. The counter shaft assembly 880 further includes a third shift dog 892 that is positioned on the counter shaft 882 to selectively lock rotation of the counter shaft 882 with the rotation of either the second driven gear 890 or the reverse driven sprocket 893. The counter shaft assembly 880 also includes fourth shift dog 897 that is positioned on the counter shaft 882 to selectively lock rotation of counter shaft 882 with rotation of the first driven gear 896.

As best illustrated in FIG. 14, this embodiment includes a park pawl assembly 980 to lock the dual clutch transaxle 800 in park. The park pawl assembly 980 includes a pivotally connected pawl 982 that has a first end that is engaged with the shift drum assembly 900. The shift drum 902 of the shift drum assembly 900 has a cam profile cut onto it such that as the shift drum rotates, the park pawl 982 rotates about pin 986. As the park pawl 982 rotates about pin 986, a second end of the park pawl 982 engages a notch 897a formed in the fourth shift dog 897. The pin 986 is locked into a gear case (not shown) so when the park pawl 982 locks into the fourth shift dog 897, the counter shaft 882 is locked to the gear case and dual clutch transaxle 800 is in park. The second end of the park pawl 982 is biased away from the fourth shift dog 897 by bias member 984. The cam profile of the shift drum 902 counters the biasing force of the bias member 984 when placing the dual clutch transaxle 800 into park. A park assembly may be placed anywhere downstream of the counter shaft 882 in an embodiment, as long as the park assembly is operationally coupled to selectively lock the counter shaft assembly 880.

Example Embodiments

Example 1 includes a dual clutch transaxle that includes a dual clutch assembly, an input shaft assembly, a counter shaft assembly, a shift assembly and at least one output assembly. The dual clutch assembly includes a first inner clutch shaft and a second outer clutch shaft. The dual clutch assembly has a dual clutch axis. The dual clutch assembly is further configured to be coupled to receive torque from a motor. The input shaft assembly includes a nested first inner input shaft and a second outer input shaft. The input shaft assembly has a plurality of drive gears. The input shaft assembly further has an input shaft axis. The input shaft axis is offset from the dual clutch axis of the dual clutch assembly. The first inner clutch shaft of the dual clutch assembly is operationally coupled to one of the first inner input shaft and the second outer input shaft of the input shaft assembly and the second outer clutch shaft of the dual clutch assembly operationally coupled to the other of the first inner input shaft and the second outer input shaft of the input shaft assembly. The counter shaft assembly has a plurality of driven gears. The plurality of drive gears of the input shaft assembly are operationally coupled to the plurality of driven gears of the counter shaft assembly. The shift assembly is operationally coupled to at least one of the input shaft assembly and the counter shaft assembly to select gearing of the dual clutch transaxle. The at least one output assembly is operationally coupled to the counter shaft assembly. The output assembly is configured to provide an output of the dual clutch transaxle.

Example 2 includes the aspects of Example 1, wherein the first inner clutch shaft of the dual clutch assembly operationally coupled to one of the first inner input shaft and the second outer input shaft of the input shaft assembly and the second outer clutch shaft of the dual clutch assembly operationally coupled to the other of the first inner input shaft and the second outer input shaft of the input shaft assembly further includes; the first inner clutch shaft operationally connected to the second outer input shaft and the second outer clutch shaft operationally coupled to the first inner input shaft.

Example 3 includes any of the aspects of Examples 1-2, wherein the at least one output assembly comprises; an output differential assembly. At least a portion of the output differential assembly is positioned under at least one of the input shaft assembly and the counter shaft assembly.

Example 4 includes any of the aspects of Example 3, wherein output differential assembly has a differential axis that is transverse to the dual clutch axis.

Example 5 includes any of the aspects of Examples 3-4, wherein the at least one output assembly further comprises; a second output assembly operationally coupled to the countershaft assembly to provide a second output for the dual clutch transaxle.

Example 6 includes any of the aspects of Example 5, wherein the second output assembly is a front output assembly having a front output axis that is parallel with the dual clutch axis.

Example 7 includes any of the aspects of Examples 1-6, wherein the input shaft assembly having a plurality of drive gears further comprises; the first inner input shaft having at least one drive gear and a second outer input shaft having at least one other drive gear.

Example 8 includes any of the aspects of Examples 1-7, wherein the shift assembly is an electrically operated shift drum assembly.

Example 9 includes any of the aspects of Examples 1-8, further including a park assembly that is operationally coupled to the counter shaft assembly to selectively lock rotation of a counter shaft during a park configuration of the dual clutch transaxle.

Example 10 includes any of the aspects of Examples 1-8, wherein the dual clutch assembly includes a nested dual clutch.

Example 11 is another dual clutch transaxle. The dual clutch transaxle includes a dual clutch assembly, an input shaft assembly, a counter shaft assembly, a shift drum assembly, first output assembly and a second output assembly. The dual clutch assembly includes a first clutch shaft and a second clutch shaft. The dual clutch assembly having a dual clutch axis. The dual clutch assembly is configured to receive torque from a motor. The input shaft assembly includes a nested first inner input shaft and a second outer input shaft. The first inner input shaft has at least one drive gear and the second outer input shaft has at least one other drive gear. The input shaft assembly further has an input shaft axis. The first clutch shaft of the dual clutch assembly is operationally coupled to one of the first inner input shaft and the second input shaft of the input shaft assembly and the second outer clutch shaft of the dual clutch assembly operationally coupled to one of the other of the first inner input shaft and the second outer input shaft of the input shaft assembly. The counter shaft assembly has at least a driven gear engaged with the at least one drive gear and at least one other driven gear engaged with the at least one other drive gear of the input shaft assembly. The shift assembly is operationally coupled to at least one of the input shaft assembly and the counter shaft assembly to select gearing of the dual clutch transaxle. The first output assembly is operationally coupled to the counter shaft assembly. The first output assembly is configured to provide a first output of the dual clutch transaxle. The first output assembly having an output axis that is transverse and below the input shaft axis. The second output assembly is operationally coupled to the counter shaft assembly.

Example 12 includes any of the aspects of Example 11, further including an electric motor to rotate a shift drum of the shift drum assembly.

Example 13 includes any of the aspects of Examples 11-12, further including a park assembly operationally coupled to the counter shaft assembly to selectively lock rotation of a counter shaft during a park configuration of the dual clutch transaxle.

Example 14 includes any of the aspects of Examples 11-12, wherein the first clutch shaft of the dual clutch assembly operationally coupled to one of the first inner input shaft and the second outer input shaft of the input shaft assembly and the second clutch shaft of the dual clutch assembly operationally coupled to one of the other of the first inner input shaft and the second outer input shaft of the input shaft assembly further comprises; a first gear set operationally coupling the first clutch shaft of the dual clutch assembly operationally to one of the first inner input shaft and the second outer input shaft of the input shaft assembly and a second gear set coupling the second clutch shaft of the dual clutch assembly operationally to one of the other of the first inner input shaft and the second outer input shaft of the input shaft assembly. The first gear set and the second gear set configured to be replaceable to change the overall gear ratios in the transaxle.

Example 15 includes any of the aspects of Examples 11-14, further including a low range drive gear coupled to a counter shaft of the counter shaft assembly; a high range gear coupled to the countershaft of the countershaft assembly; and a lay shaft assembly engaged with the low range drive gear and the high range drive gear. The lay shaft assembly is further operationally coupled to the output differential assembly and the second output assembly.

Example 16 includes any of the aspects of Examples 11-15, wherein the dual clutch assembly includes a nested dual clutch.

Example 17 include any of the aspects of Examples 11-16, wherein the first output assembly further comprises an output differential assembly.

Example 18 includes a vehicle. The vehicle includes a motor, a dual clutch transaxle, a set of rear wheels, a set of front wheels and a front differential. The motor provides torque. The dual clutch transaxle includes a dual clutch assembly, an input shaft assembly, a counter shaft assembly, a first output assembly and a second output assembly. The dual clutch assembly is coupled to receive the torque from the motor. The dual clutch assembly includes a first inner clutch shaft and a second outer clutch shaft. The dual clutch assembly has a dual clutch axis. The input shaft assembly includes a nested first inner input shaft and a second outer input shaft. The input shaft assembly has a plurality of drive gears. The input shaft assembly further has an input shaft axis. The input shaft axis is offset from the dual clutch axis of the dual clutch assembly. The first inner clutch shaft of the dual clutch assembly is operationally coupled to one of the first inner input shaft and the second outer input shaft of the input shaft assembly and the second outer clutch shaft of the dual clutch assembly operationally coupled to the other of the first inner input shaft and the second outer input shaft of the input shaft assembly. The counter shaft assembly has at least a driven gear engaged with the at least one drive gear and at least one other driven gear engaged with the at least one other drive gear of the input shaft assembly. The shift drum assembly is operationally coupled to at least one of the input shaft assembly and the counter shaft assembly to select gearing of the dual clutch transaxle. The first output assembly is operationally coupled to the counter shaft assembly. The first output assembly is configured to provide a first output of the dual clutch transaxle. The first output assembly has a first output axis that is transverse to the dual clutch axis. The second output assembly is operationally coupled to the counter shaft assembly. The set of rear wheels are operationally coupled to the output differential. The front differential is operationally coupled to the second output and the set of front wheels is operationally coupled to the front differential.

Example 19 includes any of the aspects of Example 18, wherein the first inner clutch shaft of the dual clutch assembly is operationally coupled to one of the first inner input shaft and the second outer input shaft of the input shaft assembly and the second outer clutch shaft of the dual clutch assembly operationally coupled to the other of the first inner input shaft and the second outer input shaft of the input shaft assembly of the dual clutch transaxle further comprises; the first inner clutch shaft operationally connected to the second outer input shaft and the second outer clutch shaft operationally coupled to the first inner input shaft.

Example 20 includes any of the aspects of Examples 18-19, wherein at least a portion of the output differential assembly of the dual clutch transaxle is positioned under at least one of the input shaft assembly and the counter shaft assembly.

Example 21 includes any of the aspects of Examples 18-20, wherein the input shaft assembly of the dual clutch transaxle having a plurality of drive gears further comprises; the first inner input shaft having at least one drive gear and a second outer input shaft having at least one other drive gear.

Example 22 includes any of the aspects of Examples 18-21, wherein the dual clutch transaxle further includes an electric motor to rotate a shift drum of the shift drum assembly.

Example 23 includes any of the aspects of Examples 18-22, wherein the dual clutch transaxle further includes a park assembly operationally coupled to the counter shaft assembly to selectively lock rotation of a counter shaft during a park configuration of the dual clutch transaxle.

Example 24 includes any of the aspects of Examples 18-23, wherein the first output assembly further comprises; an output differential assembly.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

PARTS LIST 100-dual clutch transaxle
102-electric shift motor
104-power port
106-dual clutch axis
108-input shaft axis
110-counter shaft axis
112-shift rail axis
114-shift drum axis -continued

PARTS LIST 116-differential axis
120-dual clutch assembly
121-dual clutch
121a-first clutch
121b-second clutch
122-first inner clutch shaft
122a-first inner clutch gear
122b-Inner end clutch splines
123-cover plate
124-second outer clutch shaft
124a-central passage
124b-outer end clutch splines
124c-second outer clutch gear
126-bearing
128 bearing
130-bearing
132-bearing
134-bearing
136-seal
138-torque clutch input shaft
140-input shaft assembly
142-first inner input shaft
142a-splines
142b-splines
143-inner input shaft first driven gear
144-second outer input shaft
144a-a second drive gear
144b-reverse drive sprocket
146-bearing
148-retaining ring
150-first drive gear
152-washer
154-washer
156-bearing
158-retaining ring
160-first shift dog
162-retaining clip
164-washer
166-bearing
168-third drive gear
170-bearing
172-washer
174-bearing
176-bearing
178-fourth drive gear
180-washer
182-retaining ring
184-third shift dog
186-retaining ring
188-retaining ring
190-washer
192-bearing
194-sixth drive gear
196-outer input shaft second driven gear
198-bearing
202-bearing
204-bearing
206-fifth drive gear
208-washer
210-retaining ring
212-fourth shift dog
214-bearing
220-counter shaft assembly
222-counter shaft
222a splines
222b-splines
222c-splines
222d splines
223-fourth driven gear
224-sixth driven gear
225-fifth driven gear
226-bearing
228-retaining ring
230-first driven gear
232-retaining ring
234-third driven gear
236-second driven gear

PARTS LIST 238-retaining ring
240-second shift dog
242-bearing
244-retaining ring
246-washer
248-bearing
250-sprocket
252-chain
254-retaining ring
256-counter shaft output drive gear
258-Park shift dog
260-retaining ring
262-bearing
270-idler assembly
272-idler shaft
272a-idler gear
272b-splines
274-bearing
276-second stage gear
278-retaining ring
280-bearing
282-front output assembly
283-front output axis
284-front output shaft
284a-front output gear
286-bearing
288-bearing
290-seal
292-third assembly
294-cluster shaft
296-bearing
298-bearing
302-third cluster gear
304-second assembly
306-cluster shaft
308-bearing
310-second cluster gear
312-bearing
314-first assembly
316-motor shaft
318-bearing
320-bearing
322-third cluster gear
324-first pinion gear
326-bearing
328-bearing
330-park assembly
332-park rail shaft
334-park pawl
336-first shift park assembly
338-nut
340-bell crank
342-O-ring
344-first sector gear
346-first shift shaft
348-the second sector gear
350a-first portion park cam
354-second portion park cam
352-torsion spring
356-retaining ring
360-second shift park assembly
362-second shift shaft
364-detent star
366-third sector gear
368-fourth sector gear
370-O-ring
372-thrust washer
374-snap ring
380-output differential assembly
382-bearing
384-engagement dog
386-differential carrier
390-differential pin
402-washer
401-dowel pin
404-first output gear
406a-first bevel pinion
406b-second bevel pinion
408-second output gear
410-washer
412-ring gear
414-bearing
416-gear assembly
418-bevel pinion
418a-bevel pinion gear
420-bearing
422-bearing cover
424-third stage gear
426-pinion bevel nut
428-spacer
430-forward gear
432-bearing
450-shift drum assembly
452-shift drum
452a-first cam track
452b-second cam track
452c-third cam track
452d-fourth cam track
454-bearing
456-bearing
458-shift drum gear
460-shift fork assembly
462-shift rail
464-first shift fork
464a-first follower tab
466-second shift fork
466b-second follower tab
468-third shift fork
468c-third follower tab
470-fourth shift fork
470d-fourth follower tab
500-vehicle
502-engine
504-front drive shaft
506-front differential
508a-first front wheel
508b-second front wheel
508c-third front wheel
508d-fourth front wheel
600-Dual clutch transaxle
602-dual clutch axis
604-input shaft axis
606-counter shaft axis
608-differential axis
620-dual clutch assembly
622-first clutch drive gear
624-second clutch drive gear
640-input shaft assembly
642-first driven input gear
644-second driven input gear
646-first inner input shaft
648-second outer input shaft
650-fourth drive gear
652-second drive gear
654-reverse drive sprocket
656-fifth drive gear
658-third drive gear
660-first drive gear
680-counter shaft assembly
682-counter shaft
684-fourth driven gear
686-first shift dog
688-second driven gear
689-fourth shift dog
690-reverse driven sprocket
691-chain
692-fifth driven gear
694-third driven gear
695-second shift dog
696-first driven gear
697-low range gear
698-third shift dog
699-high range gear
700-shift fork assembly -continued

PARTS LIST 720-shift drum assembly
740-output differential assembly
760-front output assembly
762-drop gear
763-front output shaft
764-second stage drive gear
766-driven sprocket
768-chain
772-bevel pinion shaft
774-second stage driven gear
776-drive sprocket
780-lay shaft assembly
782-lay shaft
784-high range driven gear
786-low range driven gear
788-lay shaft drive gear
800-dual clutch transaxle
802-dual clutch axis
804-input shaft axis
806-counter shaft access
808-differential axis
820-dual clutch assembly
822-first output shaft
824-second output shaft
826-first torque drive gear
828-second torque drive gear
840-input shaft assembly
842-first inner input shaft
844-second outer input shaft
846-sixth drive gear
848-first shift dog
850-fourth drive gear
852-second drive gear
854-reverse drive sprocket
855-chain
856-second torque driven gear
858-fifth drive gear
860-second shift dog
862-third drive gear
864-first torque driven gear
866-first drive gear
880-counter shaft assembly
882-counter shaft
884-rear output drive gear
886-sixth driven gear
888-fourth driven gear
890-second driven gear
892-third shift dog
893-reverse driven sprocket
894-fifth driven gear
895-third driven gear
896-first driven gear
897-fourth shift dog
897a-notches in fourth shift dog
898-front output drive gear
900-shift drum assembly
902-shift drum
920-shift fork assembly
940-output differential assembly
960-front output assembly
970-rear output assembly
972-rear output driven gear
980-park pawl assembly
982-park pawl
984-biasing member

The invention claimed is:
1. A dual clutch transaxle comprising:
a dual clutch assembly including a first inner clutch shaft and a second outer clutch shaft, the dual clutch assembly having a dual clutch axis, the dual clutch assembly configured to be coupled to receive torque from a motor;
an input shaft assembly including a nested first inner input shaft and a second outer input shaft, the input shaft assembly having a plurality of drive gears, the input shaft assembly further having an input shaft axis, the input shaft axis being offset from the dual clutch axis of the dual clutch assembly, the first inner clutch shaft of the dual clutch assembly operationally coupled to one of the first inner input shaft and the second outer input shaft of the input shaft assembly and the second outer clutch shaft of the dual clutch assembly operationally coupled to the other of the first inner input shaft and the second outer input shaft of the input shaft assembly;
a counter shaft assembly having a plurality of driven gears, the plurality of drive gears of the input shaft assembly operationally coupled to the plurality of driven gears of the counter shaft assembly;
a shift assembly operationally coupled to at least one of the input shaft assembly and the counter shaft assembly to select gearing of the dual clutch transaxle;
at least one output assembly operationally coupled to the counter shaft assembly, the output assembly configured to provide an output of the dual clutch transaxle;
a low range drive gear coupled to a counter shaft of the counter shaft assembly;
a high range gear coupled to the counter shaft of the counter shaft assembly; and
a lay shaft assembly engaged with the low range drive gear and the high range drive gear, the lay shaft assembly further operationally coupled to the at least one output assembly.

2. The dual clutch transaxle of the claim 1, wherein the first inner clutch shaft of the dual clutch assembly operationally coupled to one of the first inner input shaft and the second outer input shaft of the input shaft assembly and the second outer clutch shaft of the dual clutch assembly operationally coupled to the other of the first inner input shaft and the second outer input shaft of the input shaft assembly further comprises:
the first inner clutch shaft operationally connected to the second outer input shaft and the second outer clutch shaft operationally coupled to the first inner input shaft.

3. The dual clutch transaxle of the claim 1, wherein the at least one output assembly further comprises:
an output differential assembly, at least a portion of the output differential assembly being positioned under at least one of the input shaft assembly and the counter shaft assembly.

4. The dual clutch transaxle of claim 3, wherein the output differential assembly has a differential axis that is transverse to the dual clutch axis.

5. The dual clutch transaxle of claim 3, wherein the at least one output assembly further comprises:
a second output assembly operationally coupled to the countershaft assembly to provide a second output for the dual clutch transaxle.

6. The dual clutch transaxle of claim 5, wherein the second output assembly is a front output assembly having a front output axis that is parallel with the dual clutch axis.

7. The dual clutch transaxle of claim 1, wherein the input shaft assembly having a plurality of drive gears further comprises:
the first inner input shaft having at least one drive gear and the second outer input shaft having at least one other drive gear.

8. The dual clutch transaxle of claim 1, wherein the shift assembly is an electrically operated shift drum assembly.

9. The dual clutch transaxle of claim 1, further comprising:

a park assembly operationally coupled to the counter shaft assembly to selectively lock rotation of a counter shaft during a park configuration of the dual clutch transaxle.

10. The dual clutch transaxle of claim 1, wherein the dual clutch assembly includes a nested dual clutch.

11. A dual clutch transaxle comprising:
a dual clutch assembly including a first clutch shaft and a second clutch shaft, the dual assembly having a dual clutch axis, the dual clutch assembly configured receive torque from a motor;
an input shaft assembly including a nested first inner input shaft and a second outer input shaft, the first inner input shaft having at least one drive gear and the second outer input shaft having at least one other drive gear, the input shaft assembly further having an input shaft axis, the first clutch shaft of the dual clutch assembly operationally coupled to one of the first inner input shaft and the second outer input shaft of the input shaft assembly and the second outer clutch shaft of the dual clutch assembly operationally coupled to one of the other of the first inner input shaft and the second outer input shaft of the input shaft assembly;
a counter shaft assembly having at least a driven gear engaged with the at least one drive gear and at least one other driven gear engaged with the at least one other drive gear of the input shaft assembly;
a shift assembly operationally coupled to at least one of the input shaft assembly and the counter shaft assembly to select gearing of the dual clutch transaxle;
at least one output assembly operationally coupled to the counter shaft assembly to provide at least one output of the dual clutch transaxle, one of the at least one output assembly having an output axis that is transverse to and below the input shaft axis;
a low range drive gear coupled to a counter shaft of the counter shaft assembly;
a high range gear coupled to the countershaft of the counter shaft assembly; and
a lay shaft assembly engaged with the low range drive gear and the high range drive gear, the lay shaft assembly further operationally coupled to the at least one output assembly.

12. The dual clutch transaxle of claim 11, further comprising:
an electric motor to rotate a shift drum of the shift assembly.

13. The dual clutch transaxle of claim 11, further comprising:
a park assembly operationally coupled to the counter shaft assembly to selectively lock rotation of a counter shaft during a park configuration of the dual clutch transaxle.

14. The dual clutch transaxle of claim 11, wherein the dual clutch assembly includes a nested dual clutch.

15. The dual clutch transaxle of claim 11, wherein the at least one output assembly includes a first output assembly and a second output assembly, the first output assembly having the output axis that is traverse to and below the input shaft axis.

16. The dual clutch transaxle of the claim 15, wherein the first output assembly further comprises:
an output differential assembly.

17. A vehicle comprising:
a motor to provide torque;
a dual clutch transaxle including,
a dual clutch assembly coupled to receive the torque from the motor, the dual clutch assembly including a first inner clutch shaft and a second outer clutch shaft, the dual clutch assembly having a dual clutch axis,
an input shaft assembly including a nested first inner input shaft and a second outer input shaft, the input shaft assembly having a plurality of drive gears, the input shaft assembly further having an input shaft axis, the input shaft axis being offset from the dual clutch axis of the dual clutch assembly, the first inner clutch shaft of the dual clutch assembly operationally coupled to one of the first inner input shaft and the second outer input shaft of the input shaft assembly and the second outer clutch shaft of the dual clutch assembly operationally coupled to the other of the first inner input shaft and the second outer input shaft of the input shaft assembly,
a counter shaft assembly having at least a driven gear engaged with the at least one drive gear and at least one other driven gear engaged with the at least one other drive gear of the input shaft assembly,
a shift drum assembly operationally coupled to at least one of the input shaft assembly and the counter shaft assembly to select gearing of the dual clutch transaxle,
a first output assembly operationally coupled to the counter shaft assembly, the first output assembly configured to provide a first output of the dual clutch transaxle, the first output assembly having a first output axis that is transverse to the dual clutch axis,
a second output assembly operationally coupled to the counter shaft assembly,
a low range drive gear coupled to a counter shaft of the counter shaft assembly,
a high range gear coupled to the countershaft of the counter shaft assembly, and
a lay shaft assembly engaged with the low range drive gear and the high range drive gear, the lay shaft assembly further operationally coupled to the first output assembly and the second output assembly;
a set of rear wheels operationally coupled to the first output assembly;
a front differential operationally coupled to the second output assembly; and
a set of front wheels operationally coupled to the front differential.

18. The vehicle of the claim 17, wherein at least a portion of the first output assembly of the dual clutch transaxle is positioned under at least one of the input shaft assembly and the counter shaft assembly.

19. The vehicle of claim 17, wherein the dual clutch transaxle further comprises:
an electric motor to rotate a shift drum of the shift drum assembly.

20. The vehicle of claim 17, wherein the dual clutch transaxle further comprises:
a park assembly operationally coupled to the counter shaft assembly to selectively lock rotation of a counter shaft during a park configuration of the dual clutch transaxle.

* * * * *